(12) United States Patent
Gharib et al.

(10) Patent No.: US 8,576,381 B2
(45) Date of Patent: Nov. 5, 2013

(54) METHOD AND APPARATUS FOR QUANTITATIVE 3-D IMAGING

(75) Inventors: Morteza Gharib, San Marino, CA (US); Emilio Graff, Pasadena, CA (US); Francisco Pereira, Rome (IT)

(73) Assignee: California Institute of Technology, Pasadena, CA (US)

( * ) Notice: Subject to any disclaimer, the term of this patent is extended or adjusted under 35 U.S.C. 154(b) by 1147 days.

(21) Appl. No.: 12/011,016

(22) Filed: Jan. 22, 2008

(65) Prior Publication Data

US 2008/0278804 A1 Nov. 13, 2008

Related U.S. Application Data

(60) Provisional application No. 60/881,776, filed on Jan. 22, 2007, provisional application No. 60/881,779, filed on Jan. 22, 2007, provisional application No. 60/881,762, filed on Jan. 22, 2007.

(51) Int. Cl.
  *G01C 3/08* (2006.01)
(52) U.S. Cl.
  USPC .......... 356/4.01; 356/3.01; 356/4.1; 356/5.01
(58) Field of Classification Search
  USPC ............................... 356/3.01–28.5
  See application file for complete search history.

(56) References Cited

U.S. PATENT DOCUMENTS

| | | |
|---|---|---|
| 4,264,921 A | 4/1981 | Pennington et al. |
| 4,727,471 A | 2/1988 | Driels et al. |
| 4,879,664 A | 11/1989 | Suyama et al. |
| 4,948,258 A | 8/1990 | Caimi |
| 5,018,854 A | 5/1991 | Rioux |
| 5,031,154 A | 7/1991 | Watanabe |
| 5,075,561 A | 12/1991 | Rioux |
| 5,168,327 A | 12/1992 | Yamawaki |
| 5,206,498 A | 4/1993 | Sensui |
| 5,216,695 A | 6/1993 | Ross et al. |
| 5,235,857 A | 8/1993 | Anderson |
| 5,270,795 A | 12/1993 | Blais |
| 5,351,078 A | 9/1994 | Lemelson |
| 5,373,151 A | 12/1994 | Eckel, Jr. et al. |
| 5,579,444 A | 11/1996 | Dalziel et al. |
| 5,604,344 A | 2/1997 | Finarov |

(Continued)

FOREIGN PATENT DOCUMENTS

EP 1175106 A2 1/2002
GB 2242270 A 3/1991

(Continued)

OTHER PUBLICATIONS

PCT International Preliminary Report on Patentability.

(Continued)

*Primary Examiner* — Luke Ratcliffe
(74) *Attorney, Agent, or Firm* — Mark Stirrat; One LLP

(57) ABSTRACT

Described is a method and apparatus for obtaining additional information from an object and a method for surface imaging and three-dimensional imaging. Single lens, single aperture, single sensor system and stereo optic systems may be modified in order to successfully generate surface maps of objects or three-dimensional representations of target objects. A variety of the aspects of the present invention provide examples of the use of an addressable pattern in order to overcome mismatching common to standard defocusing techniques.

10 Claims, 22 Drawing Sheets

(56) References Cited

U.S. PATENT DOCUMENTS

| | | | |
|---|---|---|---|
| 5,714,762 A | 2/1998 | Li et al. | |
| 5,745,067 A | 4/1998 | Chou et al. | |
| 5,864,359 A | 1/1999 | Kazakevich | |
| 5,922,961 A | 7/1999 | Hsu et al. | |
| 6,157,747 A | 12/2000 | Szeliski et al. | |
| 6,229,913 B1 | 5/2001 | Nayar et al. | |
| 6,229,959 B1 | 5/2001 | Suda et al. | |
| 6,271,918 B2 | 8/2001 | Blais | |
| 6,278,847 B1 | 8/2001 | Gharib et al. | |
| 6,748,112 B1 | 6/2004 | Nguyen et al. | |
| 6,750,904 B1 | 6/2004 | Lambert | |
| 6,765,569 B2 | 7/2004 | Neumann et al. | |
| 6,912,293 B1 | 6/2005 | Korobkin | |
| 6,915,008 B2 | 7/2005 | Barman et al. | |
| 6,943,349 B2 | 9/2005 | Adamec et al. | |
| 6,955,656 B2 | 10/2005 | Bergheim et al. | |
| 6,965,690 B2 | 11/2005 | Matsumoto | |
| 7,006,132 B2 | 2/2006 | Pereira et al. | |
| 7,171,054 B2 | 1/2007 | Fiete et al. | |
| 7,236,622 B2 | 6/2007 | Chen et al. | |
| 7,260,274 B2 | 8/2007 | Sawhney et al. | |
| 7,271,377 B2 | 9/2007 | Mueller et al. | |
| 7,340,077 B2 | 3/2008 | Gokturk et al. | |
| 7,372,642 B2 | 5/2008 | Rohaly et al. | |
| 7,423,666 B2 | 9/2008 | Sakakibara et al. | |
| 7,496,226 B2 | 2/2009 | Negahdaripour et al. | |
| 7,565,029 B2 | 7/2009 | Zhou et al. | |
| 7,612,869 B2 | 11/2009 | Pereira et al. | |
| 7,612,870 B2 | 11/2009 | Graff et al. | |
| 7,668,388 B2 | 2/2010 | Bryll | |
| 7,715,918 B2 | 5/2010 | Melvin | |
| 7,747,151 B2 | 6/2010 | Kochi et al. | |
| 7,819,591 B2 | 10/2010 | Rohaly et al. | |
| 7,916,309 B2 | 3/2011 | Gharib et al. | |
| 8,179,424 B2 | 5/2012 | Moller | |
| 2003/0096210 A1* | 5/2003 | Rubbert et al. | 433/24 |
| 2003/0125719 A1 | 7/2003 | Furnish | |
| 2003/0160970 A1 | 8/2003 | Basu et al. | |
| 2003/0210407 A1 | 11/2003 | Xu | |
| 2004/0136567 A1 | 7/2004 | Billinghurst et al. | |
| 2004/0155975 A1 | 8/2004 | Hart et al. | |
| 2005/0025116 A1 | 2/2005 | Chen et al. | |
| 2006/0044546 A1* | 3/2006 | Lewin et al. | 356/4.04 |
| 2006/0092314 A1 | 5/2006 | Silverstein et al. | |
| 2006/0098872 A1 | 5/2006 | Seo et al. | |
| 2006/0209193 A1 | 9/2006 | Pereira et al. | |
| 2006/0285741 A1 | 12/2006 | Subbarao | |
| 2007/0008312 A1 | 1/2007 | Zhou et al. | |
| 2007/0056768 A1 | 3/2007 | Hsieh et al. | |
| 2007/0076090 A1 | 4/2007 | Alexander | |
| 2007/0078500 A1 | 4/2007 | Ryan et al. | |
| 2007/0103460 A1 | 5/2007 | Zhang et al. | |
| 2007/0146700 A1 | 6/2007 | Kowarz et al. | |
| 2007/0188769 A1 | 8/2007 | Rohaly et al. | |
| 2007/0195162 A1 | 8/2007 | Graff et al. | |
| 2007/0236694 A1 | 10/2007 | Gharib et al. | |
| 2008/0031513 A1 | 2/2008 | Hart | |
| 2008/0091691 A1 | 4/2008 | Tsuji | |
| 2008/0180436 A1 | 7/2008 | Kraver | |
| 2008/0239316 A1 | 10/2008 | Gharib et al. | |
| 2008/0259354 A1 | 10/2008 | Gharib et al. | |
| 2008/0278804 A1 | 11/2008 | Gharib et al. | |
| 2009/0129667 A1 | 5/2009 | Ho et al. | |
| 2009/0238449 A1 | 9/2009 | Zhang et al. | |
| 2009/0295908 A1 | 12/2009 | Gharib et al. | |
| 2010/0007718 A1 | 1/2010 | Rohaly, Jr. et al. | |
| 2011/0074932 A1 | 3/2011 | Gharib et al. | |

FOREIGN PATENT DOCUMENTS

| | | |
|---|---|---|
| JP | 2655885 B2 | 9/1997 |
| JP | 2001-16610 A | 8/2002 |
| JP | 2001-61165 A | 9/2002 |
| JP | 2003-289293 A | 10/2003 |
| JP | 2004-191240 A | 7/2004 |
| WO | WO 88/00710 A1 | 1/1988 |
| WO | WO 96/41304 A1 | 12/1996 |
| WO | WO 00/69357 A1 | 11/2000 |
| WO | WO 01/86281 A1 | 11/2001 |
| WO | WO 02/096478 A2 | 12/2002 |
| WO | WO 2006/009786 A2 | 1/2006 |
| WO | WO 2007/041542 A2 | 4/2007 |
| WO | WO 2007/056768 A2 | 5/2007 |
| WO | WO2007056768 | 5/2007 |
| WO | WO 2007/095307 A1 | 8/2007 |
| WO | WO 2007/130122 A2 | 11/2007 |
| WO | WO 2008/091691 A1 | 7/2008 |

OTHER PUBLICATIONS

Lowe, David G, "Three-Dimensional Object Recognition from Single Two-Dimensional Images," Artificial Intelligence, 31, 3 (Mar. 1987), pp. 355-395.

Wu, M.; Roberts, J. W.; and Buckley, M., "Three-dimensional fluorescent particle tracking at micron-scale using a single camera," Experiments in Fluids, 2005, 38, 461-465.

Willert, C.E.; and Gharib, M., "Three-dimensional particle imaging with a single camera," Experiments in Fluids, 1992, 12, 353-358.

PCT Invitation to Pay Additional Fees and, Where Applicable, Protest Fee.

PCT Notification of Transmittal of the International Search Report and the Written Opinion of the International Searching Authoirty.

Chang, N.L., Efficient Dense Correspondences using Temporally Encoded Light Patterns, IEEE, Oct. 12, 2003.

Dellaert, F. et al., Structure from Motion without Correspondence, Computer Vision & Pattern Recognition, 2000.

El-Hakim S.F. et al., A System for Indoor 3-D Mapping and Virtual Environments, Proceedings of the SPIE, 1997.

Favaro, P. et al., Observing Shape from Defocused Images, Int'l Journal of Computer Vision, 52(1), 25-43, 2003.

Guarnieri, A et al., 3D Modeling of Real Artistic Objects with Limited Computers Resources, Proc. Of XVIII CIPA Symposium on Architectural & Archaeological Photogrammetry, Oct. 1999.

Horn, E. et al., Toward Optimal Structured Light Patterns, 3DIM, 1997.

Koninckx, T.P. et al., A Graph Cut based Adaptive Structured Light approach for real-time Range Acquisition, 3EDPVT, 2004.

Kordelas, G. et al., State-of-the-art Algorithms for Complete 3D Model Recoonstruction, "Engage" Summer School, 2010.

Levenberg, K., A Method for the Solution of Certain Non-Linear Problems in Least Squares, Quarterly of Applied Mathematics, vol. II, No. 2, Jul. 1944.

Li, S.Z., Markov Random Field Models in Computer Vision, Springer-Verlag, 1995.

Lowe, D.G., Object Recognition from Local Scale-Invariant Features, Proc. of the Int'l Conference on Computer Vision, Sep. 1999.

Makadia, A. et al., Fully Automatic Registration of 3D Point Clouds, Proceedings of the 2006 IEEE Computer Society Conference on Computer Vision and Pattern Recognition, 2006.

Marquardt, D.W., An Algorithm for Least-Squares Estimation of Nonlinear Parameters, Journal of the Society for Industrial and Applied Mathematics, vol. 11, No. 2, Jun. 1963, pp. 431-441.

Mouaddib, E et al., Recent Progress in Structured Light in order to Solve the Correspondence Problem in Stereo Vision, Proceedings of the 1997 IEEE, Apr. 1997.

Neugebauer, P.J., Geometrical Cloning of 3D Objects via Simultaneous Registration of Multiple Range Images, Shape Modeling & Application, Mar. 1997.

Nguyen V.A. et al., Detection of the depth order of defocused images, Vision Research 45, 2005, pp. 1003-1011.

Pagés, J. et al., Implementation of a Robust Coded Structured Light Technique for Dynamic 3D Measurements, ICIP, 2003.

Pereira, F. et al., Two-frame 3D particle tracking, Measurement Science and Technology 17, 2006, pp. 1680-1692.

Raij, A. et al., PixelFlex2: A Comprehensive, Automatic, Casually-Aligned Multi-Projector Display, PROCAMS, 2003.

Raskar, R. et al., Multi-Projector Displays Using Camera-Based Registration, IEEE Visualization, 1999.

(56) References Cited

OTHER PUBLICATIONS

Rocchini, C. et al., A low cost 3D scanner based on structured light, Computer Graphics Forum (Eurographics 2001 Conf. Issue).
Rusinkiewicz, S. et al., Real-Tiime 3D Model Acquisition, ACM Transactions on Graphics, 2002.
Salvi, J. et al., Pattern codification strategies in structured light systems, Pattern Recognition, 2004.
Scharstein, D. et al., A Taxonomy and Evaluation of Dense Two-Frame Stereo Correspondence Algorithms, IJCV, 2002.
Scharstein, D. et al., High-Accuracy Stereo Depth Maps Using Structured Light, IEEE Computer Society Conf. on Computer Vision and Pattern Recognition, 2003, vol. 1, pp. 195-202.
Sinofsky, Measurement of Laser Beam Spreading in Biological Tissue Scattering, SPIE vol. 712, Lasers in Medicine (1986).
Smith, E.R. et al., Registration of combined range-intensity scans: Initialization through verification, Computer Vision and Image Understanding 110, 2008, pp. 226-244.
Subbarao, M. et al., Analysis of Defocused Image Data for 3D Shape Recovery using a Regularization Technique, SPIE, 1997.
Tardif, J. Multi-projectors for arbitrary surfaces without explicit calibration and reconstruction, DIM, 2003.
Tardif, J. et al., A MRF formulation for coded structured light, Proceedings of the $5^{th}$ Int'l Conf. on 3-D Digital Imaging & Modeling, 2005.
Wang, Z. et al., Extraction of the Corner of Checkerboard image, Proceedings of the $7^{th}$ World Congress on Intelligent Control and Automation, Jun. 25-27, 2008.
Weisstein, E., Gray Code, http://mathworld.wolfram.com/GrayCode.html.
Williams, J.A. et al., Multiple View 3D Registration: A Review and a New Technique, Systems Man. & Cybernetics 10, 1999.
Yang, R. et al., PixelFlex: A Reconfigurable Multi-Projector Display System, IEEE Visualization, 2001.
Zhang, S. et al., High-resolution, Real-time 3D Shape Acquisition, IEEE Workshop of real-tiime 3D sensors & their uses, 2004.
PCT/US2008/000991, US, International Search Report/Written Opinion, Jul. 28, 2009.
PCT/US2008/000882, US, International Preliminary Report on Patentability, Aug. 6, 2009.
PCT/US2008/000882, US, International Search Report, Jul. 5, 2009.
PCT/US2008/005313, US, International Preliminary Report on Patentability/Written Opinion, Oct. 27, 2009.
PCT/US2008/005314, US, International Preliminary Report on Patentability/Written Opinion, Oct. 27, 2009.
PCT/US2008/005315, US, International Preliminary Report on Patentability/Written Opinion, Oct. 27, 2009.
2008244494, AU, Examiner's First Report, Aug. 18, 2010.
PCT/US2008/005311, International Preliminary Report on Patentability/Written Opinion, Oct. 27, 2009.
PCT/US2008/005314, US, International Search Report, Sep. 8, 2008.
PCT/US2008/000991, US, International Preliminary Report on Patentability, Jul. 31, 2008.
PCT/US2005/021326, US, International Search Report, Feb. 1, 2007.
PCT/US2009/004362, US, Search Report, May 27, 2010.
PCT/US2009/004362, US, Preliminary Report on Patentability/Written Opinion, May 27, 2010.

* cited by examiner

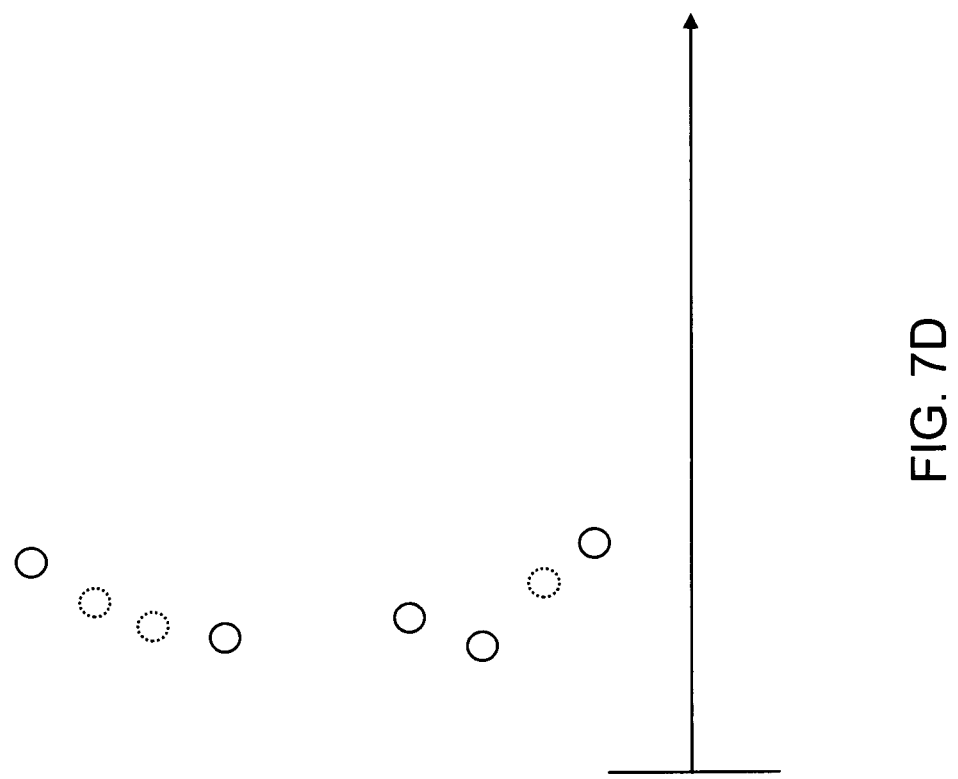

METHOD AND APPARATUS FOR QUANTITATIVE 3-D IMAGING

PRIORITY CLAIM

The present application is a non-provisional patent application, claiming the benefit of priority of U.S. Provisional Patent Application No. 60/881,776, filed Jan. 22, 2007, titled, "A Single-Lens 3-D Imaging Device based on Defocusing Technique;" U.S. Provisional Patent Application No. 60/881,779, filed Jan. 22, 2007, titled, "A Handheld 3-D Mapping Device based on the Defocusing Technique;" and U.S. Provisional Patent Application No. 60/881,762, filed Jan. 22, 2007, titled, "Method for Reducing the Number of Viewpoints Necessary in Camera-Based Quantitative 3-D Imaging Systems."

BACKGROUND OF THE INVENTION (1) Technical Field

The present invention is related to a quantitative visualization system and, more specifically, to a system for obtaining additional information from an object through surface and three-dimensional imaging.

(2) Background

Three-dimensional (3-D) imaging is a continuously evolving field that could benefit from improved imaging techniques. Enhanced 3-D imaging could be used for a variety of purposes, such as to generate quantitative information about an imaged object (through quantitative 3-D imaging). However, existing imaging techniques have failed to sufficiently support quantitative 3-D imagining. For example, when a point that is not on the focal plane of an imaging system is imaged through the imaging system, the captured point detected by a sensor is said to be defocused. If the imaging system has a large aperture, then the defocused point will appear blurred. For this reason, it has been suggested that the blur of the image of a point can be used to quantitatively determine the distance from that point to the focal plane in space. It has also been suggested that by knowing the position of the focal plane, the imaging system could be used for quantitative 3-D imaging. To reconstruct the 3-D position of a point, it is only necessary to measure the size and/or intensity of the blur disc (Z) and the point position on the sensor (X, Y).

In practice, however, such a system is difficult to effectively implement. First, a blurred image occupies a lot of space on the sensor, so sophisticated algorithms to separate overlapped images are necessary. Second, the amount of light entering the optical system does not change appreciably (unless the focal plane is very close to the optical system) between a focused point and a defocused point. Thus, the blurred image puts the same amount of energy onto the sensor as a focused image, but spread over a larger area. The intensity of a defocused image is inversely proportional to its area, so a quantitative measurement of the distance between the focal plane and a point based only on blur requires a sensor with an extremely high dynamic range. In real lenses, there is also diffraction effects which make blurred images look more like rings than broad Gaussians in certain depth ranges, making the software processing side more complicated. See, for example, Wu, M.; Roberts, J. W.; and Buckley, M., "Three-dimensional fluorescent particle tracking at micron-scale using a single camera," Experiments in Fluids, 2005, 38, 461-465. Even without lens aberrations or diffraction, image processing is complicated by the fact that since the depth information comes from a measure of the diameter of a blur spot, the intensity of the imaged point affects the measurement. For example, if two defocused points A and B have the same amount of defocus, but point A is brighter than point B, typically point B's image will be measured as having a smaller diameter than point A's simply because it does not rise as far from the background illumination in the scene.

The original "defocusing" concept recognized that in such a blur-based system, the depth information is carried only by the marginal (outer) rays of the ray pencil that forms the image. See, for example, Willert, C. E.; and Gharib, M., "Three-dimensional particle imaging with a single camera," Experiments in Fluids, 1992, 12, 353-358. It is the angle that these rays make with the sensor plane that dictates the sensitivity of the imaging system. Thus, an equivalent measurement should be possible by placing small apertures off-axis in the imaging system, such that only marginal rays may pass through to form an image. If a blur system, as described above, has its large aperture replaced with a small aperture placed anywhere on the circumference of the large aperture, then the image of a defocused point is now a small spot located on what would otherwise be the circumference of a blurred image. The end result is depth information that is transmitted not by the size of a blurred spot, but rather by a lateral offset in a much smaller spot. Measuring the location of a spot on an image is much less sensitive to intensity differences than measuring its size.

The use of small apertures alleviates the dynamic range issues with a blur-based system, since the high f-number of the small aperture makes diffraction blur (not defocus blur) the primary blurring agent in the image. This means that within a large range of distances from the focal plane, the images are almost the same size.

Using off-axis apertures means that reconstruction of a point's position in space now involves finding all the images of a single point on the sensor and measuring the distance between them. The images will appear in the same pattern as the aperture arrangement; for example, if three small apertures arranged as vertices of an equilateral triangle are used, then the image of a defocused point is three small spots arranged in an equilateral triangle. The orientation of the images' triangle relative to the apertures' triangle reveals whether the defocused point is ahead of or in front of the focal plane.

Additionally, the size of the images' triangle relates to the distance between the defocused point and the focal plane. The size of the triangle is 0 for a focused point which occurs when all three images are on top of each other. The size of the triangle increases as the amount of defocus increases. Multiple small images take up less space on the sensor than one large blurred one, so the overlap problem is alleviated by this arrangement.

The matching problem in the reconstruction generates a new problem; if the object being imaged is a set of featureless points, then the images are indistinguishable and can only be matched according to their relative location (for example, finding all dots on an image that form equilateral triangles within some tolerance). This relatively loose matching criterion necessitates that three or more apertures be used to reduce the number of mismatches or "ghosts."

A single off-axis aperture records depth information; however, Z cannot be separated from the in-plane position of the point imaged. Two apertures record the depth information and allow the in-plane position to be extracted independently of Z. In practice, it is impossible to reconstruct a random point cloud with only two apertures because many ghost particles are generated when images are mismatched. Moreover, it is impossible to know if a particle was in front of or behind the focal plane from only two images. With three apertures, mismatches are reduced and the sign of the distance from the particle to the focal plane is known by the orientation of the triangle formed by the images. See, for example, Willert, C. E.; and Gharib, M., "Three-dimensional particle imaging with a single camera," Experiments in Fluids, 1992, 12, 353-358.

The original practical implementation of the defocusing concept consists of a single lens with three off-axis apertures imaging onto a single monochromatic sensor (i.e., three was deemed the minimum number of apertures that produced acceptable results). It should be noted that because the defocusing measurement is in fact a measurement of a point's position relative to the focal plane, it is necessary to know the position of the device to know the absolute position of desired point.

The three off-axis apertures imaging onto a single monochromatic sensor also has disadvantages. Overcrowding of the sensor is still an issue when the point density within the scene is high. In this case, each point has up to three images on the sensor and there is still a possible dynamic range issue (i.e., a point on the focal plane will have three images that coincide on the sensor and thus will look three times as bright as defocused points). The dynamic range issue can be overcome by selectively illuminating the volume so that no points on the focal plane are imaged.

As described in U.S. Pat. Nos. 6,955,656 and 7,006,132, one solution to the overcrowding problem is to image each aperture with a separate sensor. This adds to the matching criterion, because now each spot on the image can only be one of the vertices of the aperture arrangement; since the source (aperture) of each spot is known, there is slightly less ambiguity in the matching process.

Further, the addition of more sensors (for example, a charge-coupled device (CCD)) has the disadvantages of higher cost and larger size (along with manufacturing complications) relative to a single-sensor system. Moreover, multiple-sensor arrangements pose alignment challenges and robustness challenges; the multiple sensors are also differently affected by temperature, vibration, and other environmental effects and as such are more prone to calibration errors.

For the foregoing reasons, there is a need for a quantitative 3-D imaging system which either alleviates or eliminates the matching problem. The system should be viable in a single-lens, single-sensor arrangement for simplicity and compactness and also should be easily expandable to a multiple-lens, multiple-sensor arrangement if so desired.

SUMMARY OF THE INVENTION

It is an objective of the present invention to provide a method for using a single-lens device for three-dimensional imaging of a surface of an object. The method comprises acts of: providing an imaging lens, an aperture configured to generate distinguishable images, a sensor, and a processor; transmitting light containing object information through the imaging lens and the aperture such that the transmitted light produces distinguishable images on the sensor; generating a plurality of distinguishable images, each of the plurality of distinguishable images including point information of the surface of the object; calculating distance information from the point information between the distinguishable images; and using the processor and distance information to generate a representation of the object.

In another aspect of the present invention, the act of providing the imaging lens, the imaging lens includes an aperture plane, and further comprises an act of placing the aperture in the aperture plane of the imaging lens.

In another aspect of the present invention, the act of providing an aperture configured to generate distinguishable images, the aperture is configured to generate distinguishable images by selectively transmitting light containing object information according to light characteristics.

In another aspect of the present invention, in the act of providing an aperture configured to generate distinguishable images, the aperture is configured to generate distinguishable images that change as a function of time such that the distinguishable images are allowed to pass through the aperture as a function of time.

In another aspect of the present invention, in the act of providing an aperture configured to generate distinguishable images, the aperture includes a series of different shapes such that the transmitted light through the aperture produces distinguishable, shape-based images.

In another aspect of the present invention, further comprising an act of placing the aperture in a location selected from a group consisting of being in front of the imaging lens and being behind the imaging lens.

In another aspect of the present invention, in the act of providing an aperture configured to generate distinguishable images, the aperture is configured to generate distinguishable images by selectively transmitting light containing object information according to light characteristics.

In another aspect of the present invention, in the act of providing an aperture configured to generate distinguishable images, the aperture is configured to generate distinguishable images that change as a function of time such that the distinguishable images are allowed to pass through the aperture as a function of time.

In another aspect of the present invention, in the act of providing an aperture configured to generate distinguishable images, the aperture includes a series of different shapes such that the transmitted light through the aperture produces distinguishable, shape-based images.

In another aspect of the present invention, in the act of providing the imaging lens, the imaging lens includes an aperture plane, and further comprising an act of providing a relay lens system such that the aperture is positioned at the aperture plane.

In another aspect of the present invention, in the act of providing an aperture configured to generate distinguishable images, the aperture is configured to generate distinguishable images by selectively transmitting light containing object information according to light characteristics.

In another aspect of the present invention, in the act of providing an aperture configured to generate distinguishable images, the aperture is configured to generate distinguishable images that change as a function of time such that the distinguishable images are allowed to pass through the aperture as a function of time.

In yet another aspect of the present invention, in the act of providing an aperture configured to generate distinguishable images, the aperture includes a series of different shapes such that the transmitted light through the aperture produces distinguishable, shape-based images.

In another aspect of the present invention, a method for constructing a representation of a surface of a target object by using an addressable pattern is provided. The method comprising acts of: acquiring a plurality of images of an addressable pattern from different viewpoints, each of the plurality of images comprising addressable pattern information and at least one point representing at least one aspect of a target object; processing the plurality of images to assign an address to each point in each of the plurality of images; developing an addressed list of points using the address of each point in each of the plurality of images; returning the addressed list of points to an imaging system processor for conversion into a three-dimensional measurement; and causing the imaging system processor to generate a representation of a surface of a target object based on the three-dimensional measurement.

In another aspect of the present invention, the method further comprises an act of projecting the addressable pattern image onto the surface of the target object to generate a plurality of images of an addressable pattern.

In another aspect of the present invention, in the act of projecting the addressable pattern image onto the surface of the target object, the projected addressable pattern image is a pattern selected from a group consisting of a color sequence pattern and a shape sequence pattern.

In another aspect of the present invention, in the act of projecting the addressable pattern image onto the surface of the target object, the projected addressable pattern image is a position sequence pattern.

In another aspect of the present invention, in the act of physically placing an addressable pattern image onto the surface of the target object.

In another aspect of the present invention, in the act of projecting the addressable pattern image onto the surface of the target object, the projected addressable pattern image is a pattern selected from a group consisting of a color sequence pattern and a shape sequence pattern.

In another aspect of the present invention, in the act of projecting the addressable pattern image onto the surface of the target object, the projected addressable pattern image is a position sequence pattern.

In another aspect of the present invention, in the act of providing a target object such that the addressable pattern is inherent in the target object being imaged.

BRIEF DESCRIPTION OF THE DRAWINGS

The objects, features and advantages of the present invention will be apparent from the following detailed descriptions of the disclosed aspects of the invention in conjunction with reference to the following drawings, where:

FIG. 7D is an illustration of the reconstructed illustration of the center sample of FIG. 7C;

DETAILED DESCRIPTION

Figure 1A:
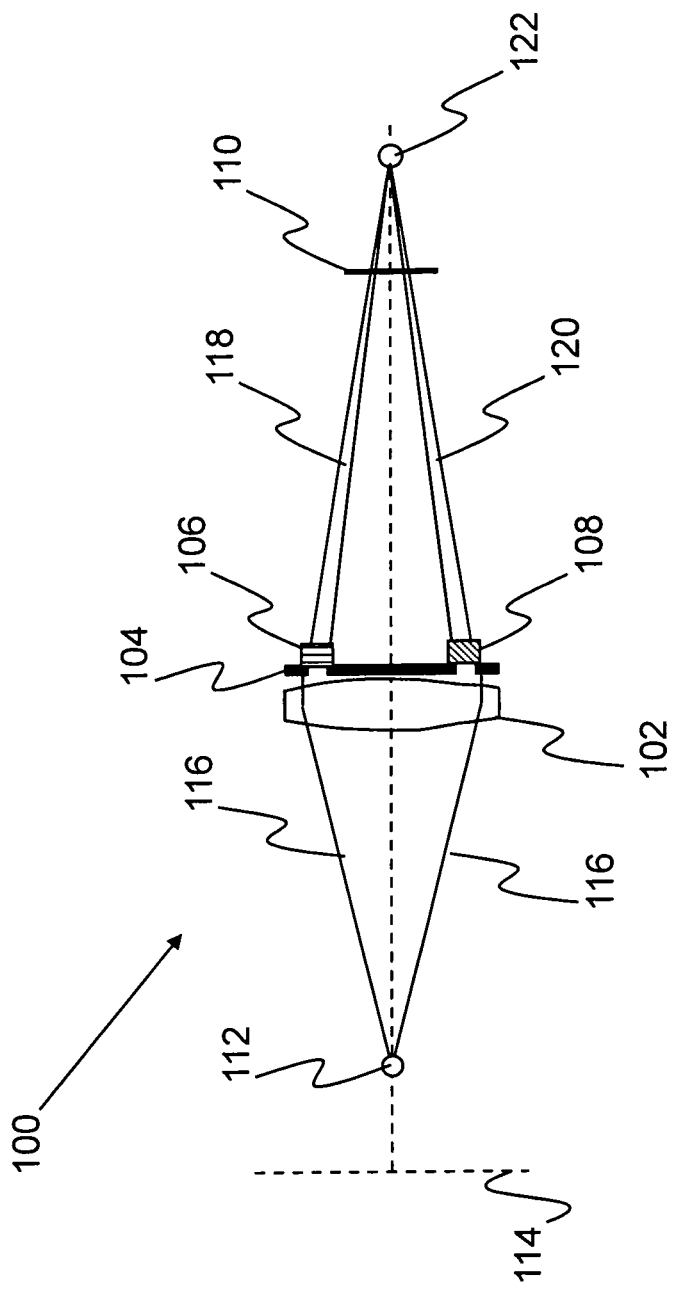
FIG. 1A is an illustration of a band-pass filter system that includes a sensor.

The present invention satisfies the long felt need for an inexpensive and precise way of three-dimensional imaging (e.g., mapping). Aspects of the invention are applicable to surface and volume inspection of manufactured parts, comparing actual products versus the original design, scanning of 3-D objects, evaluation of body parts (hernias, arteries, pre- and post-plastic surgery, etc.), surface roughness evaluation, and real-time feedback of surface deformation. In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

First, an introduction to the present invention is provided to give an understanding of the general aspects. Second, defocusing methods based on light properties and mask shape are discussed with respect to feature mapping. Third, aspects of single aperture systems are discussed with respect to feature mapping. Fourth, examples of pattern matching are provided. Fifth, imaging methods according to the present invention are provided. Finally, a discussion of image matching is provided.

(1.0) Introduction

Blur from defocus can be used to measure the distance between a point and the focal plane of a lens. Proposed are added dimensions in terms of optical and illumination techniques to the single-lens multiple-aperture arrangement that overcome the shortcomings of the original defocusing concept. The following aspects allow for robust measurement of an object surface with a single-lens, single-sensor, and multiple-aperture device.

Optical modifications to the multiple-aperture arrangement physically mask and convey filtered information to the sensor in such a way that each aperture produces a separable image for reconstructing an object surface. In order to produce a separable image, the aperture mask may be modified by altering the shape of the aperture, by coding the transmittance of the aperture, or providing a single-slit mask whose hole moves about the aperture plane during or between exposures. Each of the aperture masks provides additional information which aides in representing the desired features of an object.

A single-lens, single-sensor, multiple aperture device may be further augmented to obtain additional information from the object by using registered information. Registered information may be obtained from the distinguishing characteristics of the object, from information projected onto the surface of the object, or from information or markers placed directly onto the object.

For large objects which cannot be captured with a single exposure, the aforementioned aspects may provide information which may be used to fit multiple exposures together in order to recreate surface features of a desired object. Alternatively, multiple images can be scanned in for both large and small objects in order to produce a high resolution representation of the object or object feature. The matching concept is equally applicable to stereo vision systems.

Aspects of the present invention will now be described more fully hereinafter with reference to the accompanying drawings, in which preferred embodiments of the invention are shown. This invention may be embodied in many different forms and should not be construed as limited to the embodiments set forth herein. Further, the dimensions of layers and other elements shown in the accompanying drawings may be exaggerated to more clearly show the details. The present invention should not be construed as being limited to the dimensional relations shown in the drawings, nor should the individual elements shown in the drawings be construed to be limited to the dimensions shown.

(2.0) Light Property and Shape-Based Systems

A masked aperture generates a distinguishable image as light from an illuminated object is passed through a lens, through a masked aperture, and onto a sensor suitable for receiving the information from the masked aperture. The masked aperture passes coded and defocused information of the object onto a suitable sensor. The defocused information provides a measurement of a point on an object relative to the focal plane. The coded information from the masked aperture provides the information required in order to separate overlapping images and match corresponding points detected by the sensor.

When two or more masked apertures are used, each mask is ideally different from the other such that the intensity versus wavelength properties and/or morphology of detected shapes from the masked aperture(s) is easily distinguishable on the sensor. A variety of filtering apertures may be used in order to selectively filter light according to its properties onto a light sensor such that the images from each aperture are distinguishable. Further, when the shapes of two or more apertures are distinguishable, each aperture image detected by the sensor is also distinguishable. Therefore, non-limiting examples of suitable aperture masks and filters include wavelength band-pass filters, light polarization filters, and differentially shaped masks.

(2.1) Color Coded Filters

Referring to FIG. 1A, a band-pass filter system 100 is shown. The band-pass filter system 100 includes a lens 102, a mask 104 having a red aperture 106 and a green aperture 108, and a sensor 110. Although shown as a red and green aperture 106 and 108 respectively, any number and combination of color filtered aperture may be used in combination with an appropriate sensor 110. Thus, while the apertures are referred to specifically as the color red and green apertures 106 and 108, they are not intended to be limited thereto and could alternatively be referred to as a first aperture, a second aperture, and so forth.

The band-pass filter system 100 produces a representation of the illuminated object 112 when placed in front of the focal plane 114. Scattered light 116 is reflected form the surface of the illuminated object 112 and through the lens 102. Once through the lens 102, the scattered light 116 selectively passes through either the red aperture 106 or the green aperture 108, or is reflected off of or absorbed by the mask 104. The transmitted red light 118 from the red aperture 106 produces a transmitted green light 120 from the green aperture 108 is then recorded on the sensor 110 positioned in front of the focal image point 122.

Figure 1B:
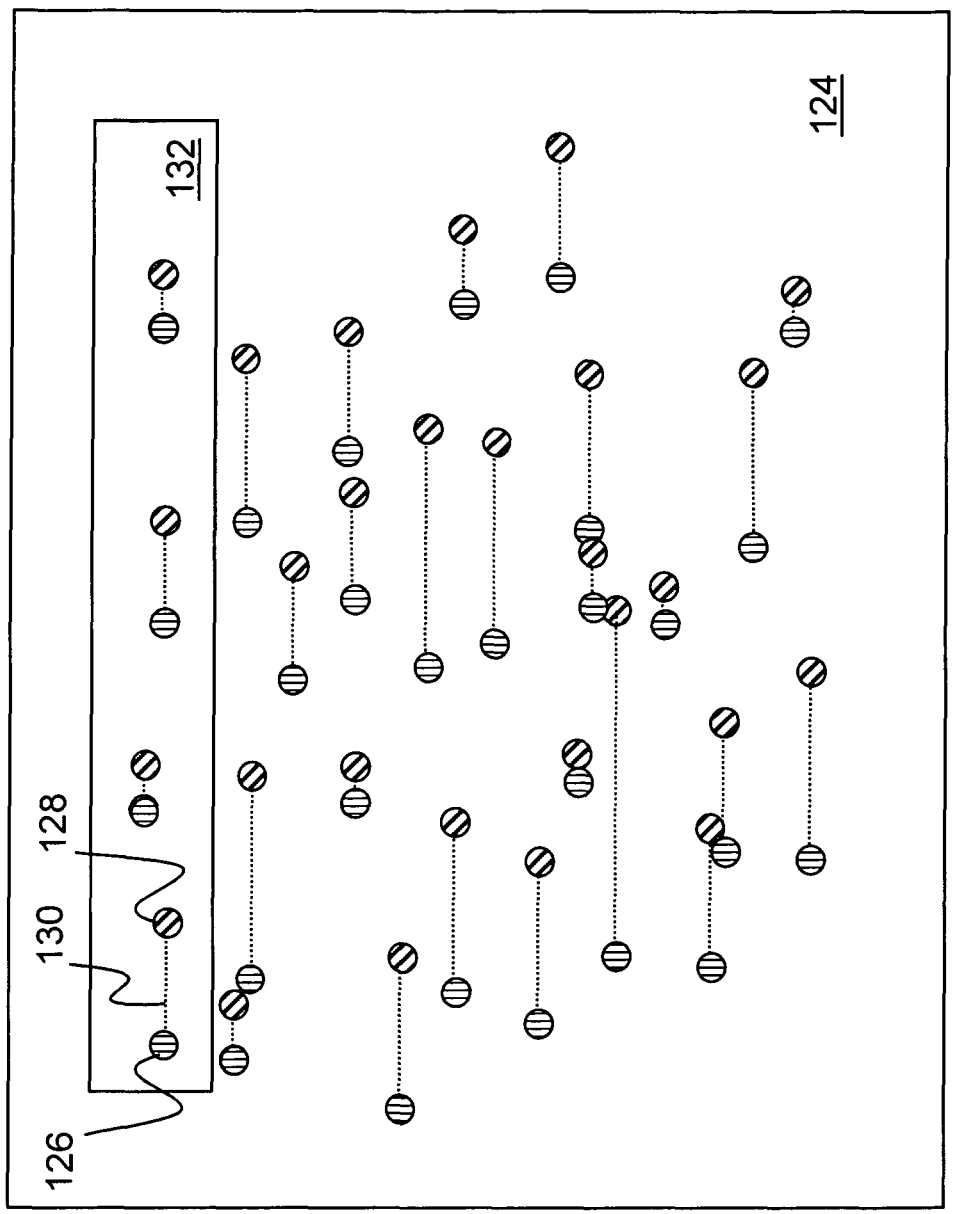
FIG. 1B is an illustration of a defocused, multiple, color-coded image acquisition of real points as received by the sensor of FIG. 1A.

Referring to FIG. 1B, a defocused, multiple color-coded image acquisition 124 of real points are shown as received by the sensor 110 of FIG. 1A. Each color-coded acquisition 124 corresponds with a multi-wavelength addressable pattern created by the respective aperture 106 and 108. As shown in FIG. 1B, each real point on the object is represented with multi-wavelength addressable pattern red dots 126 and green dots 128. As can be appreciated by one skilled in the art, the red and green dots 126 and 128 are a result of the red and green apertures, respectively; however, the invention is not limited thereto as the color of the dots would vary according to the color and combination of the apertures. Corresponding red dots 126 and green dots 128 are shown linked together with a correspondence line 130. The correspondence lines 130 are not visible; however, they are a useful illustration tool highlighting the difficulty of matching points in color-coded image acquisitions 124. Only the dots connected by correspondence lines 130 actually correspond together. Without the mask 104, there would not be enough information to link corresponding points.

Figure 1C:
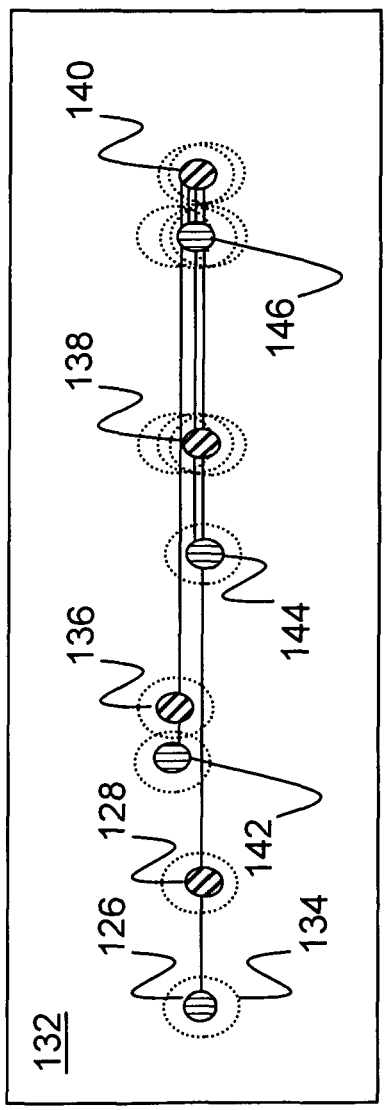
FIG. 1C is an enhanced-view illustration of the framed area of FIG. 1B, demonstrating the matching procedure for a multi-wavelength addressable pattern in the form of a red dot and its corresponding green dot.

Referring to FIG. 1C, an enhanced-view of the framed area 132 of FIG. 1B illustrates the matching procedure between a corresponding red dot 126 and green dot 128. When the multiple color-coded image acquisition 124 has been developed, a processor then begins a search for all of the color coded dots within the image. Alternatively, the search may be conducted from raw data (i.e., an image 124 need not be produced). Instead, the sensor 110 is coupled to a processor which receives the sensor information directly. In either case, once all dots have been detected, the matching process begins with an assumption of the relative position of the illuminated point 112 with respect to the focal plane 114. The relative position of the illuminated point 112 with respect to the focal plane 114 may be known a priori, entered by a user, determined by software, or determined by sensors. Here, it is postulated that the illuminated point 112 of the object is in front of the focal plane 114. Therefore, the matching begins with the instruction command, for example: "Any green dot 128, 136, 138, and 140 to the right of a red dot 126, 142, 144, and 146 on a line corresponding to a line connecting the two apertures (within a tolerance) is a match." The first red dot 126 is detected, and then matched to the first green dot 128 within tolerance 134 of the red dot 126 according to the instruction command. Supplemental searches conducted for green dots 136, 138, and 140 within the tolerance 134 of the red dot 126 produces a total of three "ghost" matches (green dots 136, 138, and 140, respectively).

Figure 1D:
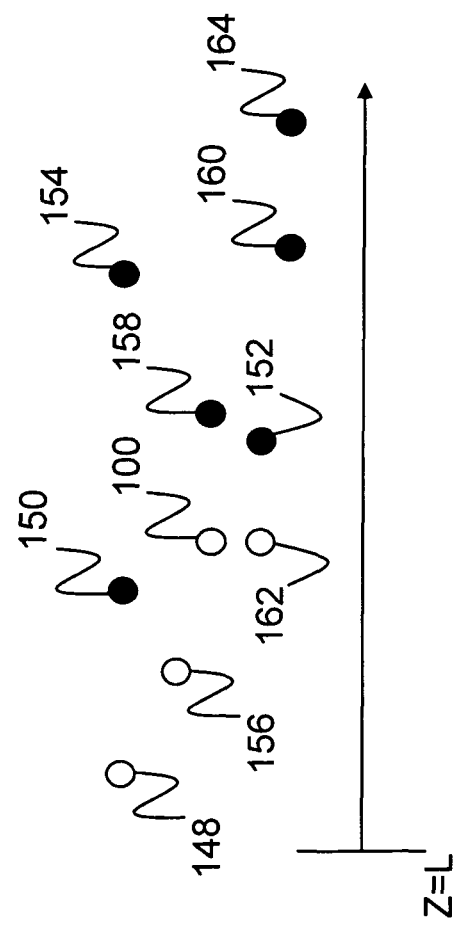
FIG. 1D is a chart illustrating the relationship of focal length (L) to Z-distance of matches and "ghost" particles with respect to FIG. 1C.

Referring to FIG. 1D, the relationship of focal length (L) to Z-distance of matches and "ghost" particles with respect to FIG. 1C is shown. The matching of the red dot 126 to all of the green dots 128, 142, 144, and 146 results in one match 148 and three ghosts 150, 152, and 154. The match between the red dot 126 and the green dot 128 is used to calculate the Z-to-L relationship of the first matched point 148. The mismatch between the red dot 126 and the green dots 136, 138, and 140 provides the first three ghosts 150, 152, and 154, respectively.

With respect to the second red dot 142, one match 156 and two ghosts 158 and 160 are produced. The match between the second red dot 142 and the corresponding green dot 136 is used to calculate the Z-to-L relationship of the second matched point 156. The mismatch between the red dot 142 and green dots 138 and 140 is represented by the two ghosts 158 and 160 respectively.

With respect to the third red dot 144, one match 162 and two ghosts 158 and 160 are produced. The match between the third red dot 144 and the corresponding green dot 138 is used to calculate the Z-to-L relationship of the third matched point 162. The single mismatch between the red dot 144 and green dot 140 is represented by the ghost 164.

Finally, with respect to the fourth red dot 146, one match 162 but no ghosts are generated. The match between the fourth red dot 146 and the corresponding green dot 140 is used to calculate the Z-to-L relationship of the fourth and final matched point 166. Since there are no other green dots to the right of the red dot 146 other than the matching green dot 140, no additional mismatches exist for the framed area 132 of FIG. IC.

Determining the relationship of focal length (L) to Z-distance between matches and "ghost" particles is greatly enhanced by differentially coded points, such as those shown 126 and 128 in FIG. 1B. In a non-separable case, one in which there is no color information provided by an aperture mask 104, there are many more ghosts because, without having a differentiator like color, each "red dot" of FIG. 1A can be matched with any other "red dot" producing many more ghosts. Further, no assumptions can be made that any given dot by itself is not in fact two dots on top of the other, adding even more ghosts at the focal plane.

(2.2) Polarized Filters

Figure 2:
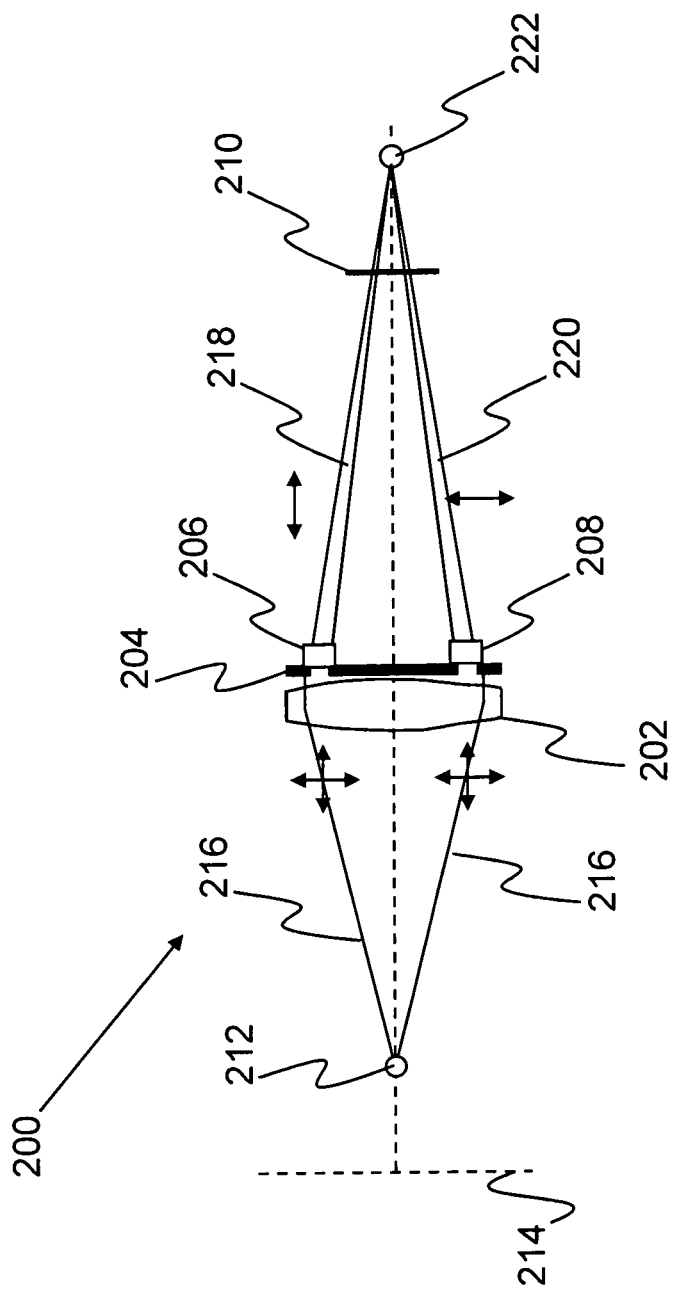
FIG. 2 is an illustration of a polarized filter imaging system.

Coded information may be provided to a sensor in any number of ways. As a non-limiting example, FIG. 2 illustrates a polarized filter imaging system 200. The polarized filter imaging system 200 includes a lens 202, a mask 204 having a horizontal polarizing aperture 206 and a vertical polarizing aperture 208, and a sensor 210 capable of distinguishing between polarizations. Although shown as a combination of horizontally and vertically polarized apertures 206 and 208 respectively, any number and combination of at least nearly orthogonal pairs of orientations may be used.

The polarized filter imaging system 200 produces a representation of the illuminated object 212 when placed in front of the focal plane 214. Scattered light 216 is reflected form the surface of the illuminated object 212 and through the lens 202. Once through the lens 202, the scattered light 216 selectively passes through either the horizontal polarizing aperture 206 or the vertical polarizing aperture 208, or is reflected off of the mask 204. The transmitted horizontally polarized light 218 from the horizontal polarizing aperture 206 and the transmitted vertically polarized light 220 from the vertical polarizing aperture 208 is then recorded on the sensor 210 positioned in front of the focal image point 222.

By differentially coding the horizontal polarizing aperture 206 and a vertical polarizing aperture 208, distinguishable dots, similar to those shown in FIG. 1B, are obtained. However, the coded information obtained from the present polarized aspect provides polarization markers instead of color coded dots.

Selectively transmitting light (as is the case with a bandpass filter system 100) or exploiting properties of light (as is the case with a polarized filter imaging system 200) are effective means of coding information received by a sensor. Ultimately, the coded information detected by the sensor eases the task of matching described with respect to FIG. 1C and FIG. 1D.

(2.3) Physical Mask Shape

Figure 3:
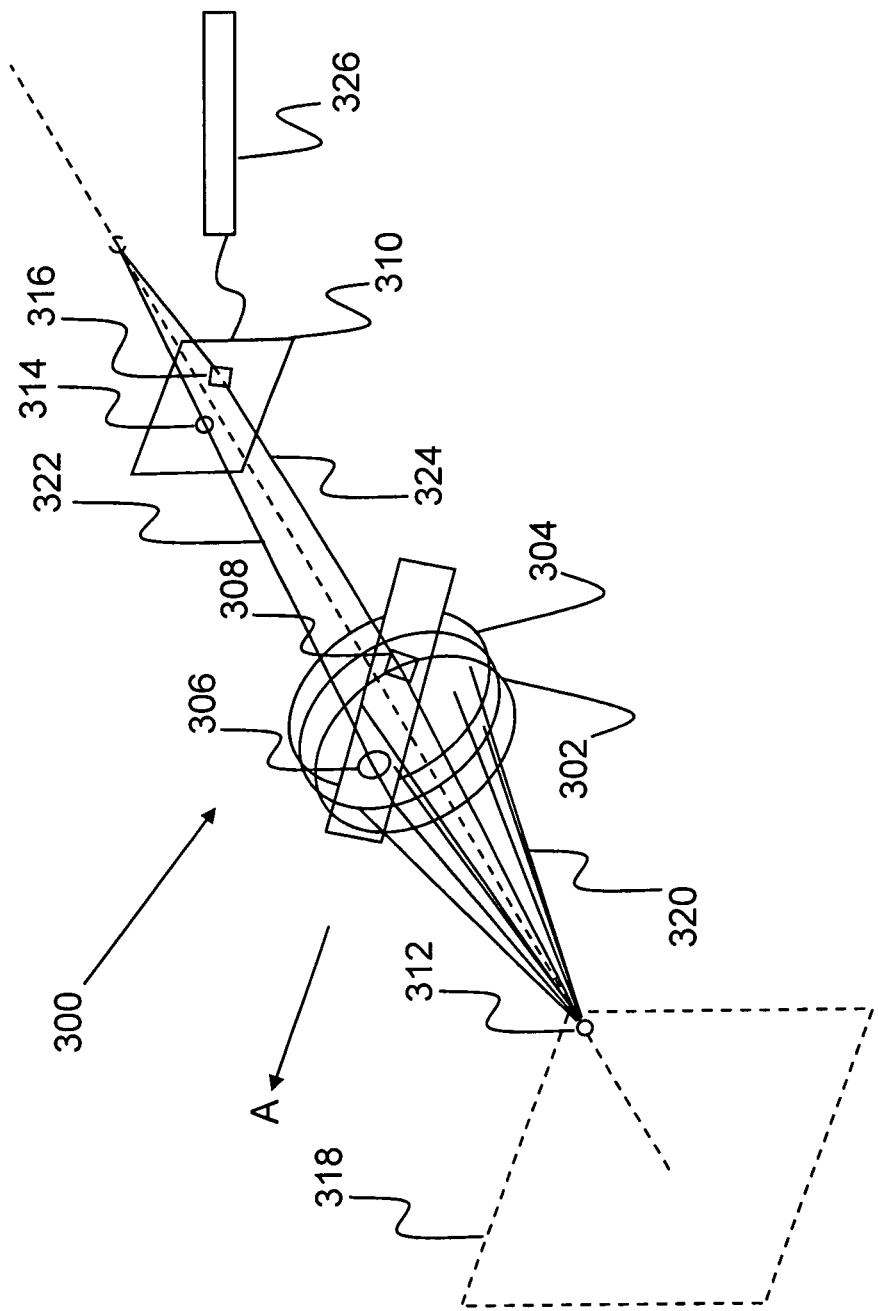
FIG. 3 is an illustration of an aperture system for imaging points.

Referring to FIG. 3, a differentially-shaped aperture system 300 for imaging points small enough to be considered nearly point sources, is shown. The differentially-shaped aperture system 300 includes a lens 302, a mask 304 having a circular-shaped aperture 306 and a square-shaped aperture 308, and a sensor 310. Although shown as a circular-shaped aperture 306 and a square-shaped aperture 308, any number and combination of different shape-filtered apertures may be used. Non-limiting examples of suitable shapes include convex polyhedrons, concave polyhedrons, circular shapes, polyforms, and combinations thereof.

The differentially-shaped aperture system 300 produces two representations 314 and 316 of the illuminated object 312 per exposure. Each shape 314 and 316 detected by the sensor 310 corresponds to the shape of the respective aperture 306 and 308, respectively. As scattered light 320 is reflected off the surface of the illuminated object 312 and through the lens 302, it will either pass through the circular-shaped aperture 306, the square-shaped aperture 308, or be reflected by the mask 304 and beyond the sensor focal plane 318. The transmitted light 322 which passes through the circular-shaped aperture 306 produces a circular pattern 314 on the sensor 310. Similarly, the transmitted light 324 which passes through the square-shaped aperture 308 produces a square pattern 316 on the sensor 310. After multiple acquisitions, the numerous circular patterns 314 and square patterns 316 are detected and then matched by a processor 326 based upon a matching rule. Both the matches and ghosts may then be plotted on a Z-to-L plot, such as the one depicted in FIG. 1D. Alternatively, a plot demonstrating the matches without ghost images may also be generated.

(3.0) Single Aperture System

Figure 4A:
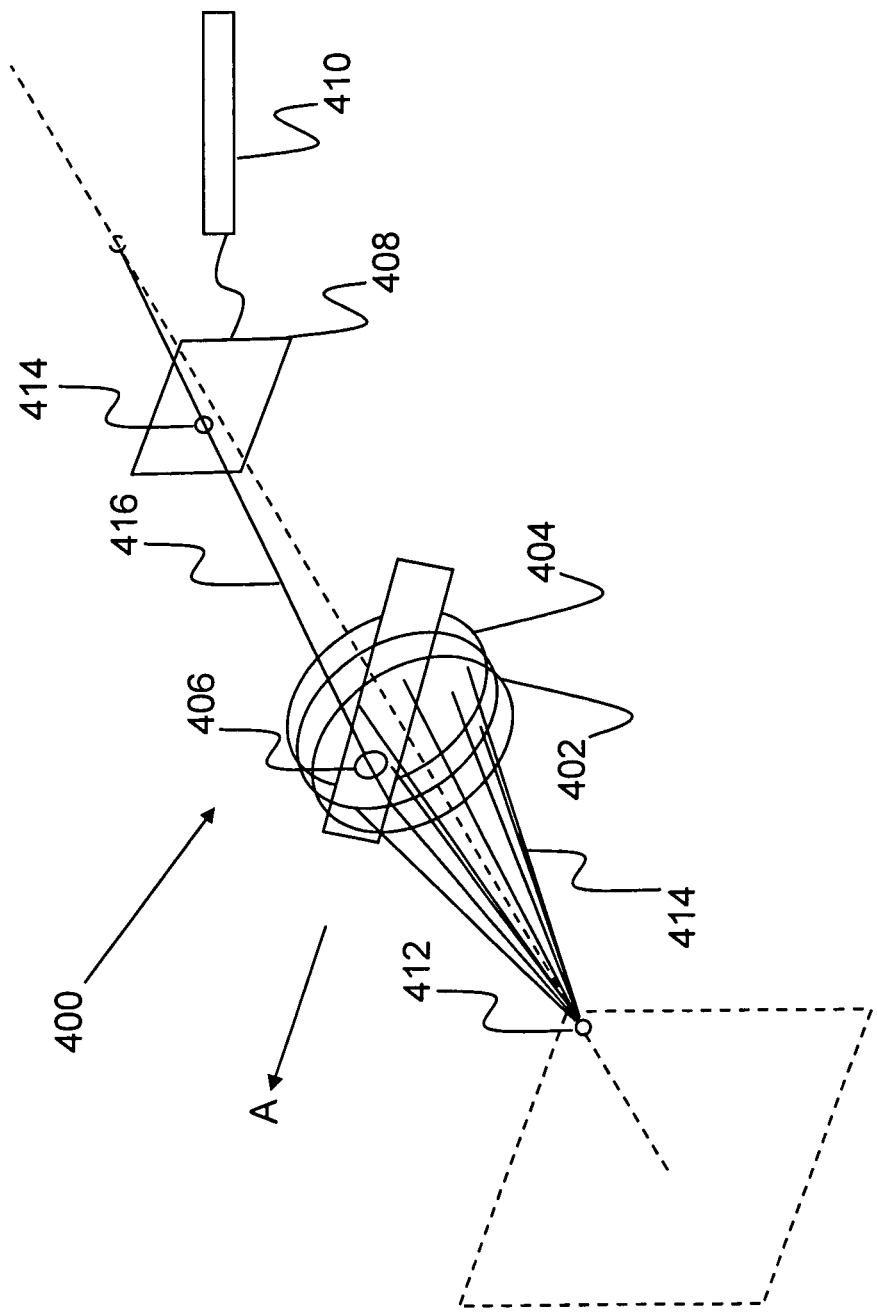
FIG. 4A is an illustration of a synched, single-aperture system with a single-hole mask shown in a first position A.
Figure 4B:
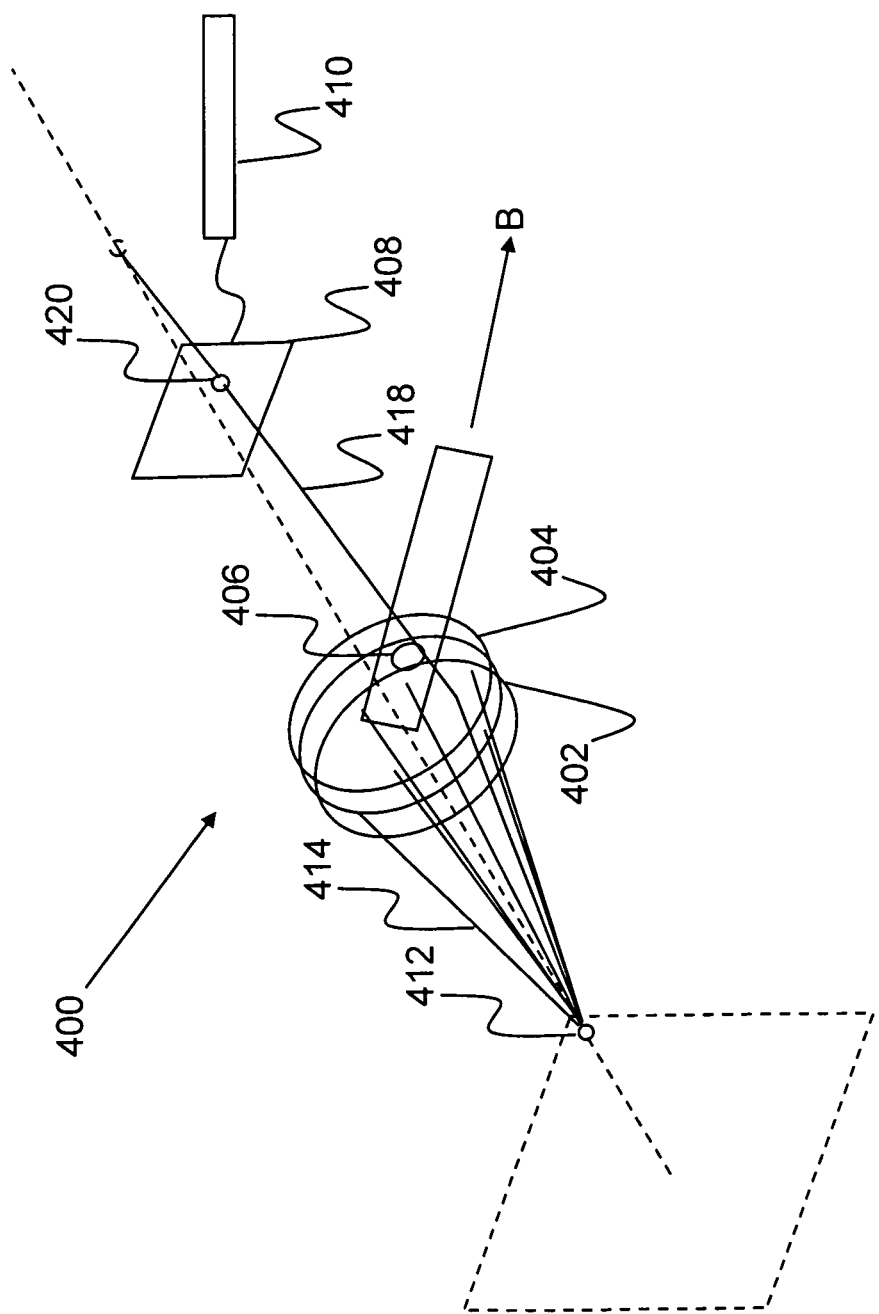
FIG. 4B is an illustration of a synched single-aperture system with a single-hole mask shown in a second position B.

Referring to FIG. 4A and FIG. 4B, a synced single-aperture system 400 includes a lens 402, a single-hole mask 404, a moving aperture 406, a sensor 408, and a processor 410 in communication with the sensor 408, is shown. Additionally, the single-hole mask 404 is shown in a first position A and second position B, respectively. An illuminated object 412 may be reconstructed by selectively allowing reflected rays 414 to pass through the lens 402 and the long and narrow slit-aperture 406 of the single-hole mask 404. The position of the single-hole mask 404, whose aperture 406 moves about the aperture plane between exposures, is recorded by the processor 410. As shown in FIG. 4A, the moving aperture 406 transmits light 416 and produces a first point 414 detected by the sensor 408. The first position information of the moving aperture 406 during the first exposure is recorded by the processor 410. For the second exposure, the moving aperture 406 is moved to the second position B. As shown in FIG. 4B, the moving aperture 406 transmits light 418 and produces a second point 420 detected by the sensor 408. The second position information of the moving aperture 406 during the second exposure is recorded by the processor 410. The first point 414 and first position information and second point 420 and second position information are then used to match the first point 414 from the first exposure with those of the second point 420. Alternatively, the color of the reflected rays 414 may be altered between the first exposure and second exposure in order to provide additional information which may be used to aide in the matching process.

(3.1) Single Slit-Aperture System

Figure 5A:
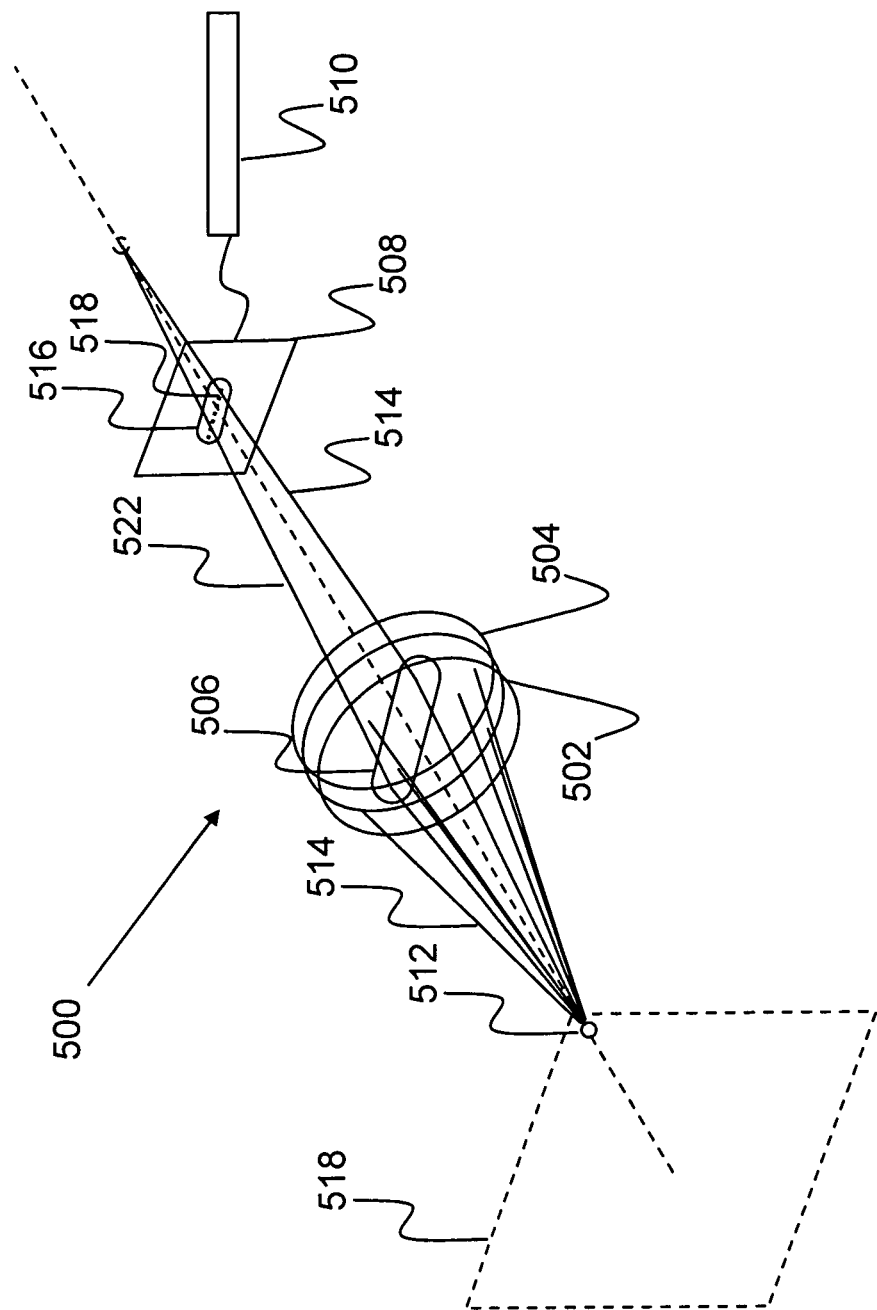
FIG. 5A is an illustration of a single-aperture system having multiple f-stops.

Referring to FIG. 5A, a single-aperture system 500 having multiple f-stops is illustrated. The differentially-shaped aperture system 500 includes a lens 502, a mask 504 having a long and narrow slit-aperture 506, a sensor 508, and a processor 510 in communication with the sensor 508. Although shown as a roughly oblong-shaped aperture 506, in general, any aperture which is significantly longer in length than in width may be used regardless of shape. Also, the slit aperture 506 could be made to be asymmetric in shape such that the front and back of the focal plane can be distinguished.

An illuminated object 512 may be reconstructed by selectively allowing reflected rays 514 to pass through the lens and the long and narrow slit-aperture 506 of the mask 504. Notably, the single-aperture system 500 uses a long, narrow, slit-aperture 506, instead of a standard circular aperture. Effectively the slit aperture 506 has a different f-number in two directions. The long length of the slit aperture 506 produces a low f-number which generates a large variance disc 516 on the sensor 508. Conversely, the narrow width of the slit aperture 502 produces a high f-number, generating a minimum variance, such that the image of a point source is represented by lines 518 rather than discs 516. The intensity can now be thought of as varying inversely with length rather than area, so the dynamic range required on the sensor is much decreased relative to a pure-blur system. Further, the size of the produced images 516 and 518 only increase in one direction, minimizing the chance for overlap.

Figure 5B:
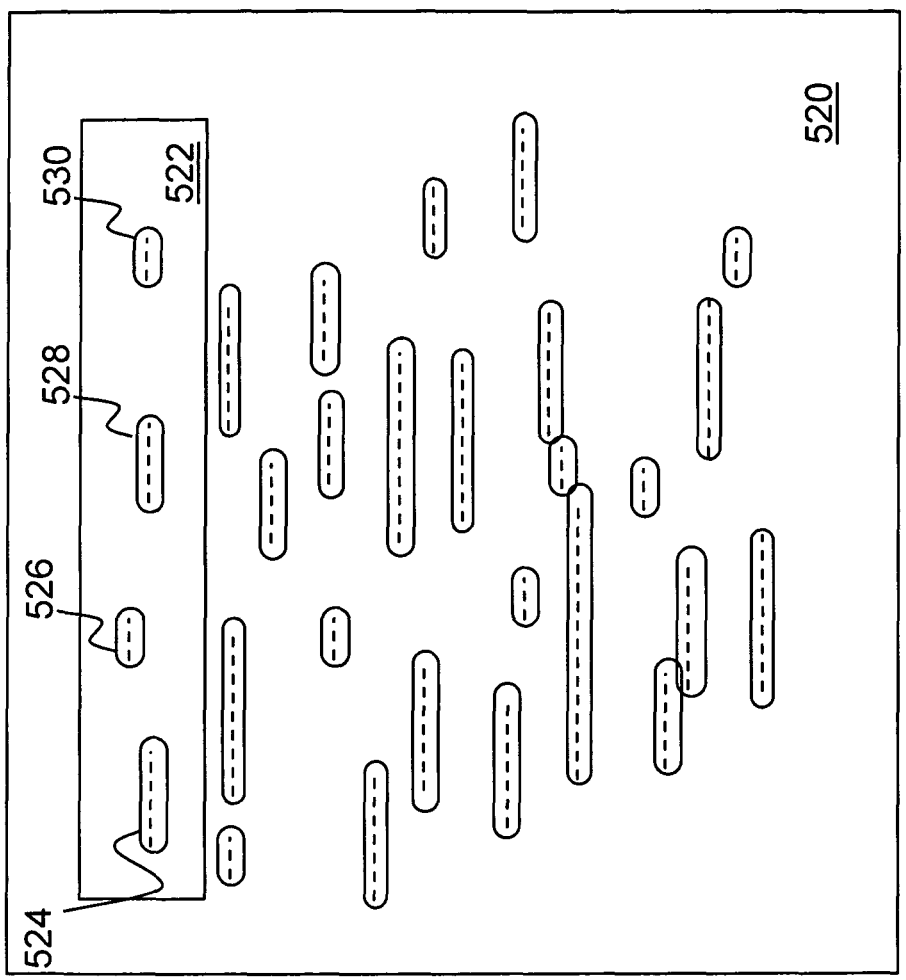
FIG. 5B is an image acquired from the sensor of a single-aperture, multiple f-stop system.

Referring to FIG. 5B, an image 520 acquired from the sensor 508 of a single-aperture multiple f-stop system 500 is shown. Within the frame 522 of the image 520, multiple plots 524, 526, 528, and 530 with different Z-coordinates are shown. Although shown as an image 520, the information depicted may also be conditioned and sent via a signal to a processor 510 for processing.

Referring to FIG. SC, the framed area 522 of the acquired image of FIG. SB is processed in order to find the multiple f-stop streaks 524, 526, 528, and 530 corresponding with the aperture movement. Once all of the multiple f-stop streaks 524, 526, 528, and 530 have been found, a rule is applied to determine the Z-to-L relationship. Notably, no matching is required.

By assuming all of the points were in front of the focal plane "L," the multiple f-stop streaks 524, 526, 528, and 530 are used to calculate the Z-to-L relationship. An example of matched points 532, 534, 536, and 538 determined by a processor 510 are shown in FIG. 5D. In general, the processor 510 connected with the sensor 508 may be used to collect the raw data obtained from the sensor. The processor 510 then may use the Z-to-L relationships in order to calculate the depth information of each detected f-stop streaks 524, 526, 528, and 530. The processor 510 may then be used to generate a representation of the object from the depth information of each illuminated point 512. In another aspect, the processor 510 may also include memory. The memory may be used to store calibration information of previously sampled points at known distances. The calibration information may be stored as a look-up table in the image-acquisition system for fast in-line processing. Alternatively, the calibration information may be stored remotely and accessed by the processor.

Figure 5C:
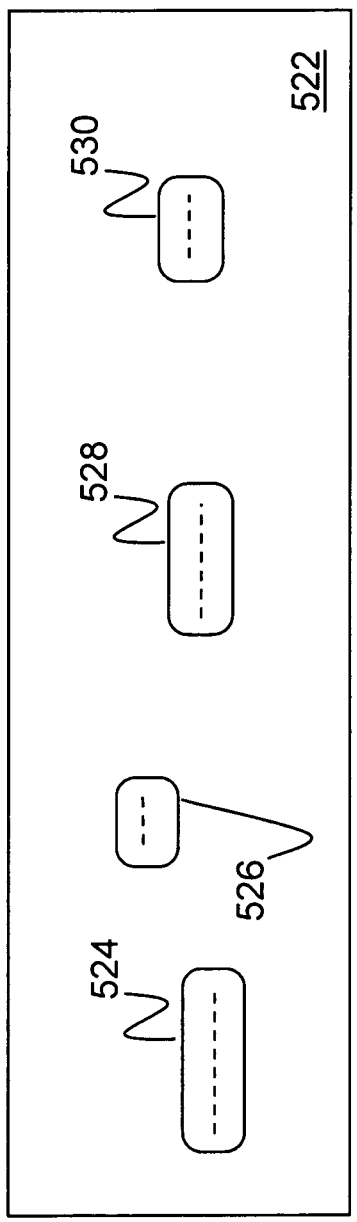
FIG. 5C is an enhanced-view illustration of the framed area of FIG. 5B.
Figure 5D:
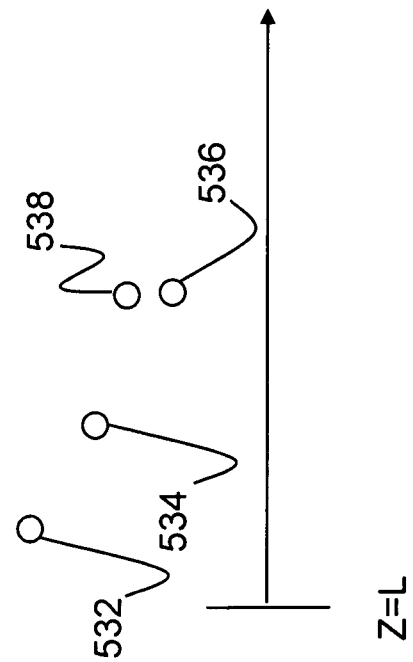
FIG. 5D is an illustration of a chart of matched points as determined by a processor.
Figure 5E:
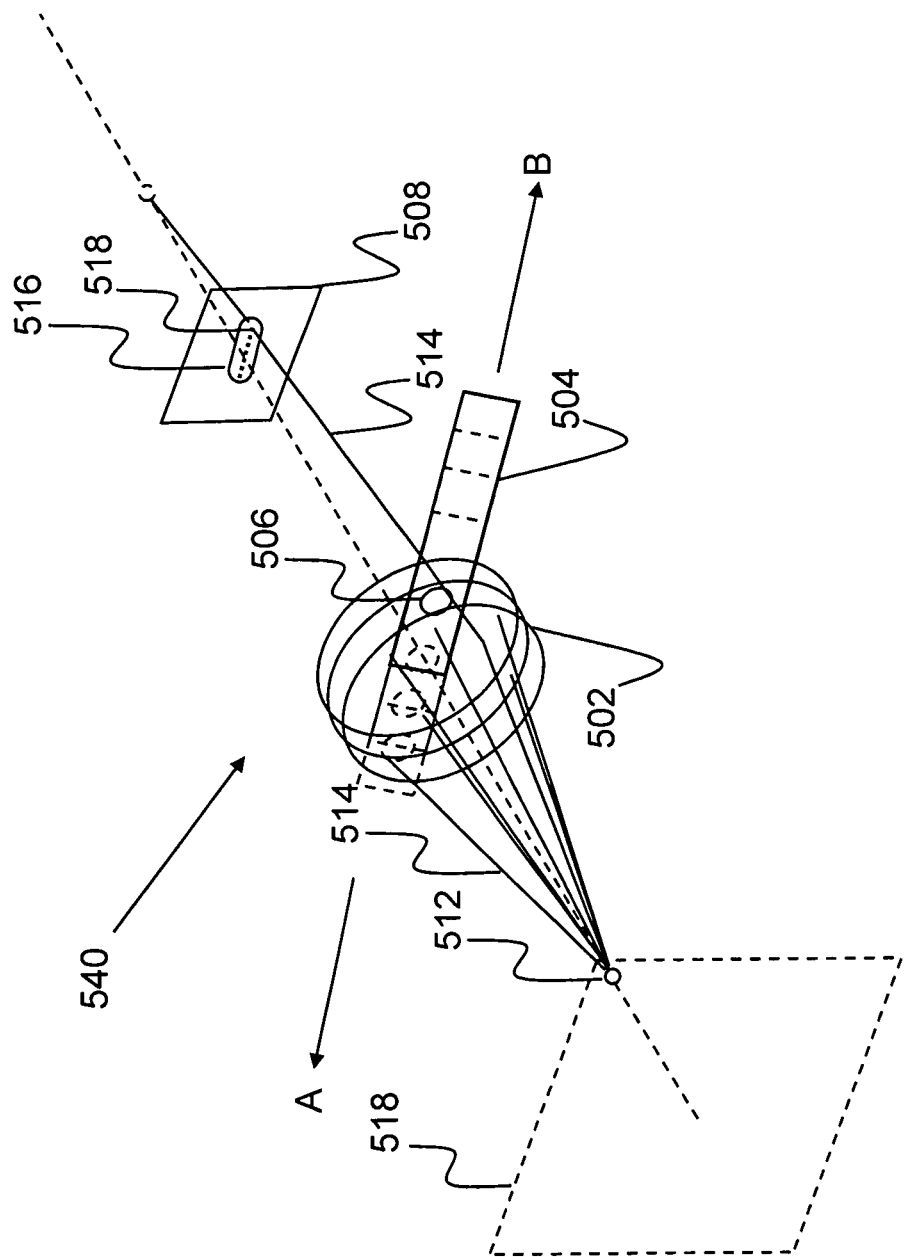
FIG. 5E is an illustration of a vibrating, single-aperture system.

The results depicted in FIG. 5B, FIG. 5C, and FIG. 5D may also be obtained by using a vibrating, single-aperture system 540 such as the one illustrated in FIG. 5E. The vibrating, single-aperture system 540 includes a lens 502, a mask 504 having a single moving aperture 506, and a sensor 508.

An illuminated object 512 may be reconstructed by selectively allowing reflected rays 514 to pass through the lens and the long and narrow slit-aperture 506 of the mask 504. Notably, the single-aperture system 500 uses a moving aperture 506, effectively simulating the effect of having a different f-number in two directions. As the moving aperture 506 controllably oscillates right to left in the direction of A and B (or in any other suitable direction), the net displacement of the moving aperture 506 from A to B produces a low f-number. The low f-number of this lateral movement from A to B generates a large variance disc 516 on the sensor 508. Further, as the moving aperture 506 moves from A to B, there is no net change to the vertical diameter of the moving aperture 506. The constant height of the moving aperture 506 therefore produces a high f-number, generating a minimum variance, such that the image of a point source is represented by lines 518 rather than discs 516.

The intensity is dependent upon the amount of time the aperture 506 spends at a particular axial position, thus the images would look more like bright ends connected by dimmer straight lines. Further, the size of the produced images 516 and 518 only increase in one direction, minimizing the chance for overlap.

In one aspect, the invention can be thought of as a two-aperture system with the ambiguity of matching removed by simply connecting the two aperture images physically on the imager. When imaging large objects through the aperture (not point sources), three images are visible. The center image is the image of the object, and the outer two images are formed as a result of diffraction and lens effects. As the scale of the object decreases, it approaches a point source, and at the limiting case, the image of the point source object has the same shape as the aperture.

(3.2) Electronic Masked Aperture

Figure 6A:
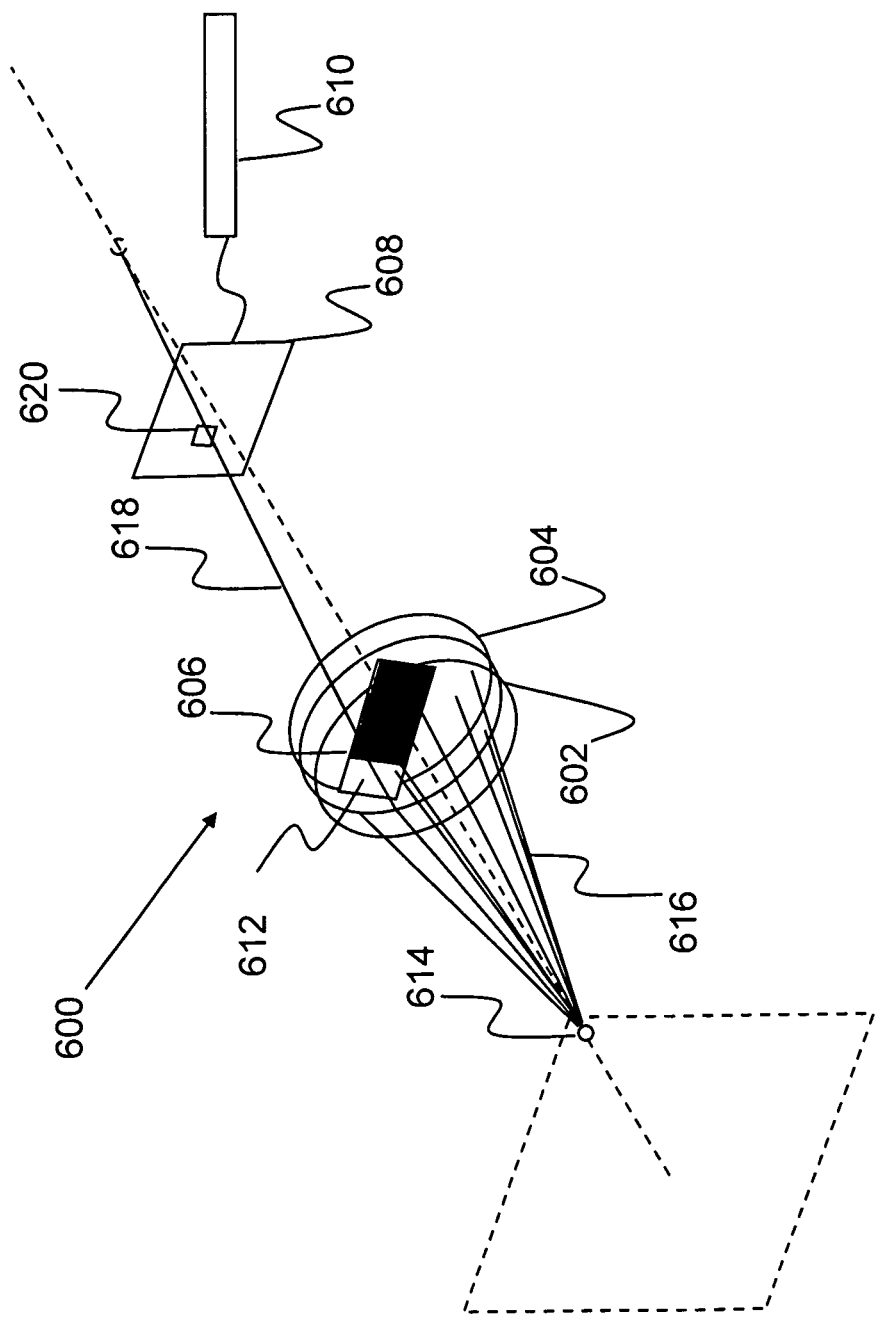
FIG. 6A is an illustration of an electronically masked imaging system with a first, multi-window electronic aperture open.
Figure 6B:
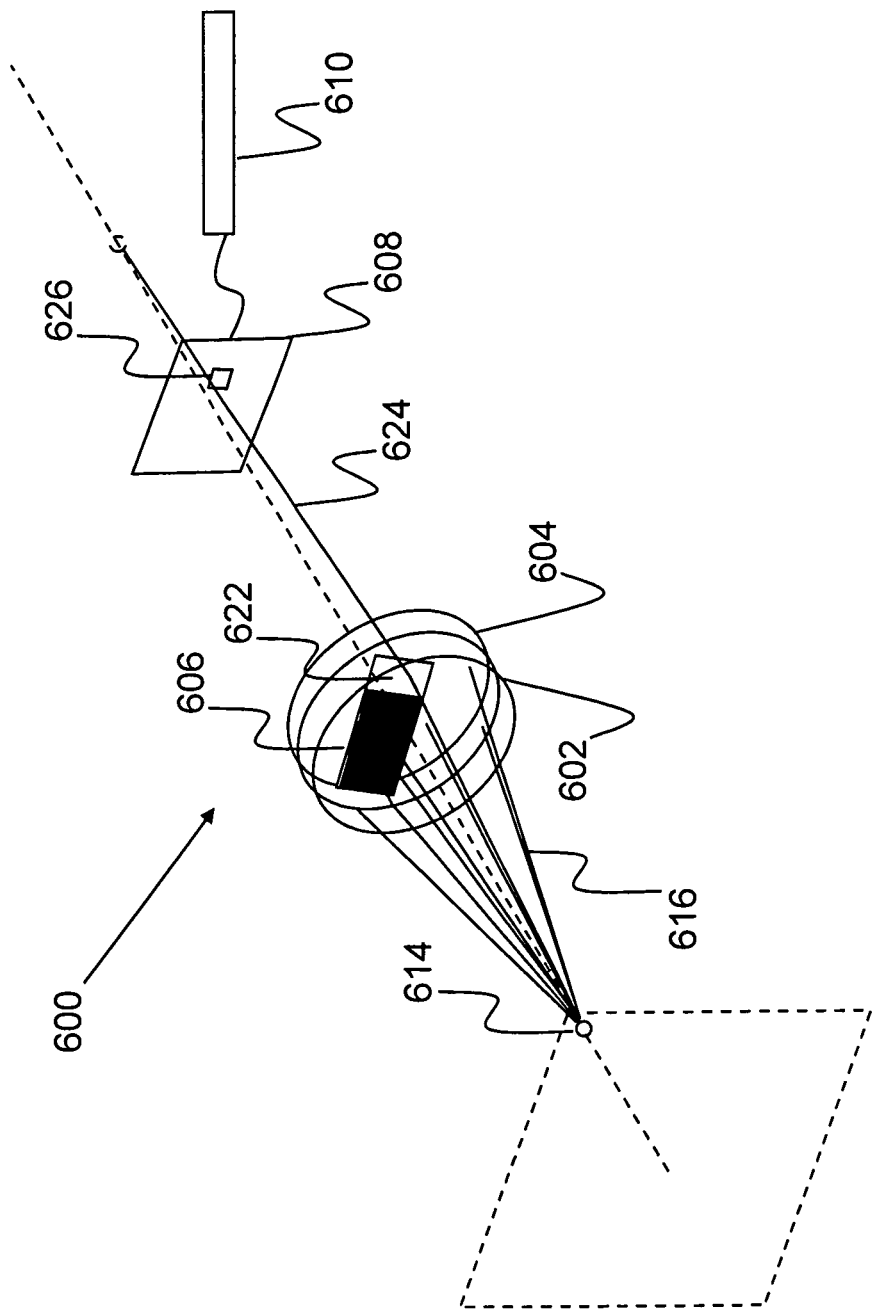
FIG. 6B is an illustration of an electronically masked imaging system with a second, multi-window electronic aperture open.

Referring to FIG. 6A and FIG. 6B, an electronically masked imaging system 600 including a lens 602, an aperture plate 604, a multi-window electronic aperture 606, a sensor 608, and a processor 610 in communication with the sensor 608 and aperture plate 604, is shown. Non-limiting examples of suitable aperture plates 604 include a liquid crystal display (LCD) which may be fully synchronized with the acquisition sensor 608. In one aspect, the sensitivity may be controlled by varying the "off-axisness" of the apertures. An illuminated object 614 may be reconstructed by selectively allowing reflected rays 616 to pass through the lens 602 and one of the many windows of the multi-window electronic aperture 606.

As shown in FIG. 6A, a first window 612 of the multi-window electronic aperture 606 transmits light 618 and produces a first point 620 detected by the sensor 608. During the first exposure, the first open window 612 position information is recorded by the processor 610.

To obtain a second exposure, a second window of the multi-window electronic aperture 606 is opened. As shown in FIG. 6B, a second window 622 of the multi-window electronic aperture 606 transmits light 624 and produces a second point 626 detected by the sensor 608. During the second exposure, the second open window 622 position information is recorded by the processor 610. The first point 620 and first open window 612 position information and second point 626 and second position open window 622 position information are then used to match the first point 620 from the first exposure with the information of the second point 626.

(4.0) Pattern Matching

If the object of interest is a surface whose shape is to be matched, a pattern of markers may be projected on the surface and the points in the detected image may be sampled by measuring the relative position of the projected markers. The sensor's allowable upper density limit of imaged dots is the imaging system's limit. Once the points are identified in each view, there is only the question of whether the same point exists in both views. In another aspect, if the volume to be mapped contains a cluster of asymmetrical cells in a volume, then the shape and orientation of the cells can be used as an additional constraint in the inter-view matching, thus reducing the chance that a mismatch can occur. This aspect is referred to as "feature matching".

Figure 7B:
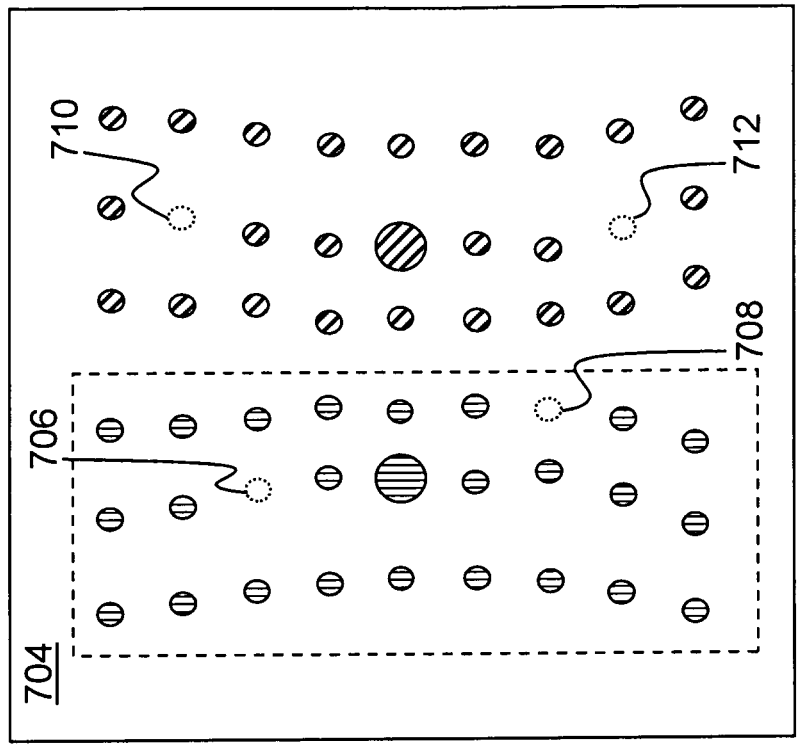
FIG. 7B is an illustration of an acquired image taken of a target object using an addressable template.
Figure 7A:
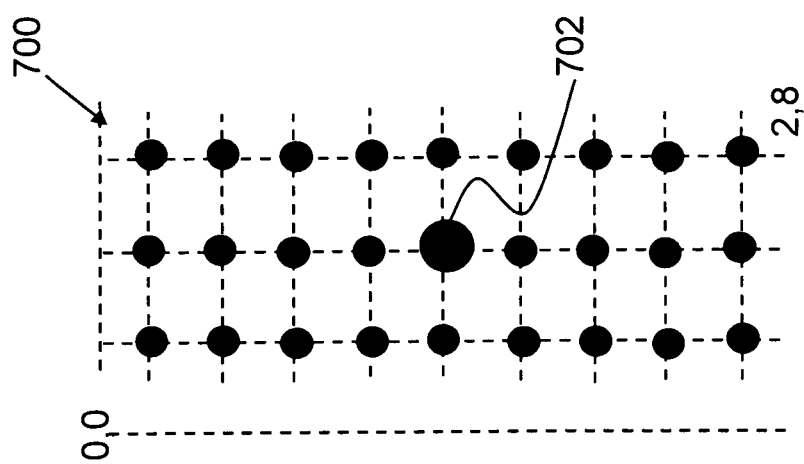
FIG. 7A is an illustration of an addressable template pattern suitable for projection onto a surface of an object of interest.

Referring to FIG. 7A, an illustration of an addressable template pattern 700 suitable for projection onto the surface of the object of interest is shown. The addressable template pattern 700 is projected or physically placed on the target surface and then captured by an imaging system at varying distances (Z) from the object. In one aspect, the addressable template pattern 700 is in the form of a grid pattern with a distinguishable center point 702.

Referring to FIG. 7B, an illustration of an acquired image 704 taken of a target object using an addressable template is shown. As illustrated, some dots 706, 708, 710, and 712 are missing in the acquired image 704.

Figure 7C:
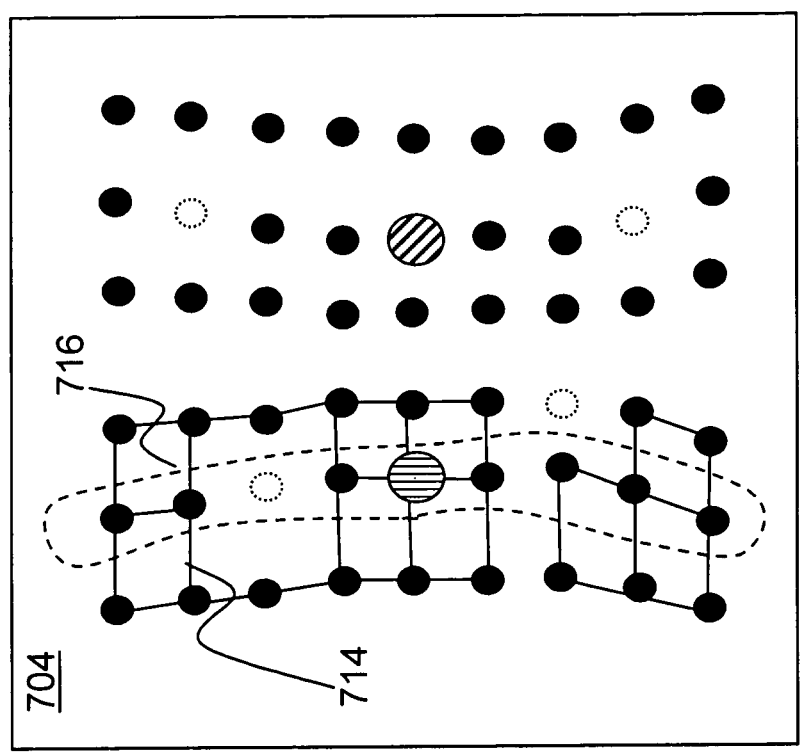
FIG. 7C is an illustration of an acquired image and partial grid.

Referring to FIG. 7C, the acquired image 704 with a partial grid 714 is shown. If the addressable pattern 702 is ordered, a grid pattern 714 with a distinguishable origin can employ a method such as "structured pattern matching" to reduce the number of required viewpoints, or image acquisitions, to two. The addressing algorithm, such as one stored on a computer readable medium or executed by a processor, processes each aperture's image to "find the relative address" of each dot in the addressable pattern 704 according to the template pattern. A non-limiting example of a suitable addressable template pattern 700 is illustrated in FIG. 7A. The addressing algorithm has some tolerance to allow for deformation of the addressable pattern 704 (See FIG. 7B and FIG. 7C). The deformation of the addressable pattern 704 is noticeable when contrasted with the original addressable template pattern 700 (See FIG. 7A). Further, the addressing algorithm can also account for missing entities 706, 708, 710, and 712 in the acquired image 704. Missing information is considered missing when a point on the addressable template pattern 700 does not appear in the addressable pattern 704.

A reconstructed illustration of the center sample 716 of FIG. 7C is illustrated in FIG. 7D. The points are reconstructed by calculating the Z for each pair of dots with the same address. Any pair with a missing dot is not reconstructed.

(4.1) Pattern Projector (Non-Laser)

Figure 8A:
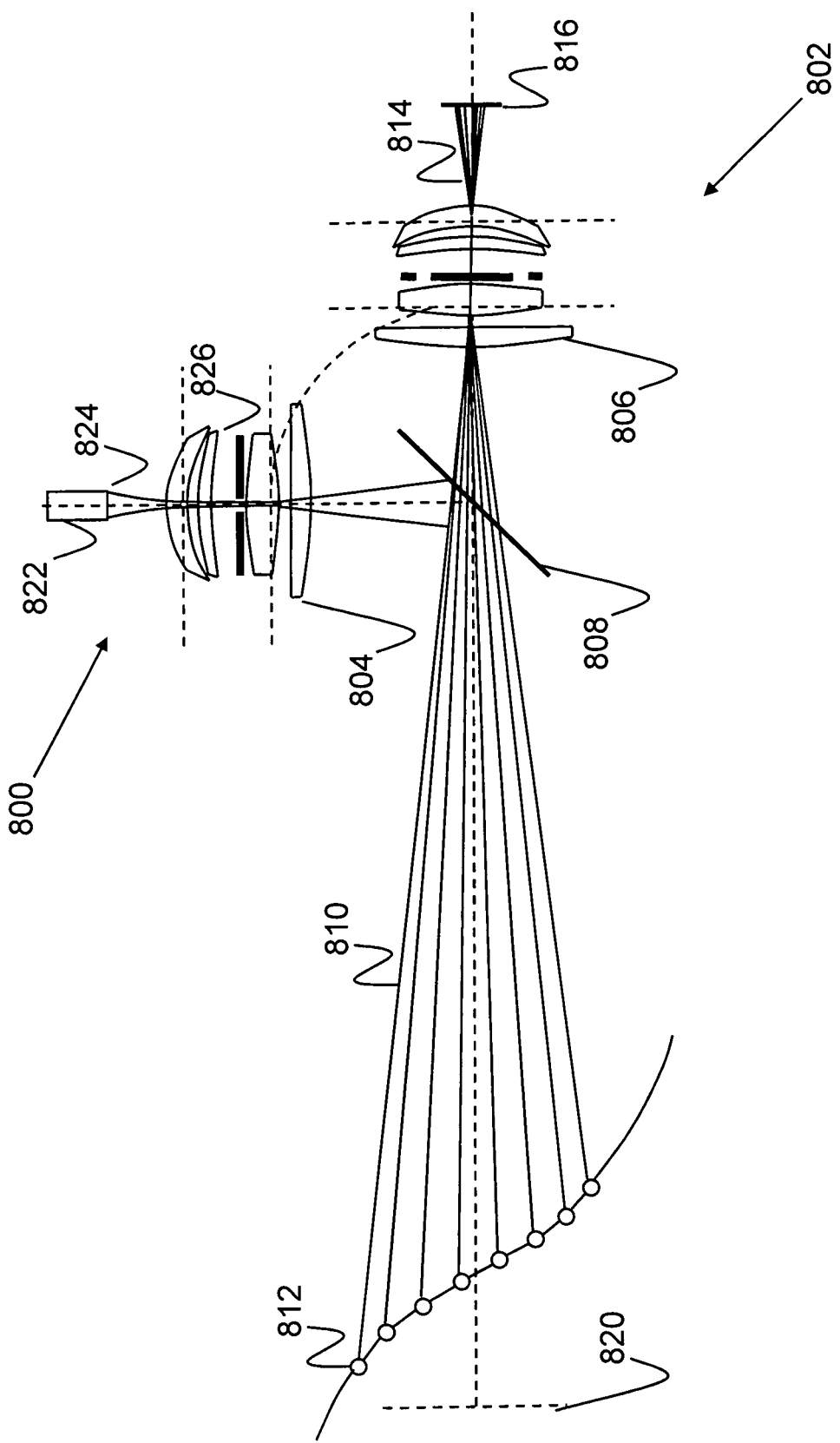
FIG. 8A is a non-laser pattern projector and imaging system.

Referring to FIG. 8A, a non-laser pattern projector 800 and imaging system 802 are shown. The non-laser pattern projector 800 comprises a lens 804 identical to the imaging lens 806 of the imaging system 802. The lens 804 of the non-laser pattern projector 800 is placed at an equivalent distance from the beamsplitter 808 as the lens 806 of the imaging system 802.

This causes the principal rays 810 of the projected points 812 to coincide with the principal rays 814 detected by the sensor 816 of the imaging system 802. Thus the projected pattern 818 will look as though it does not move in the detected image, even when the distance between the projected point 812 and the focal plane 820 of the imaging lens 806 changes. This makes identifying an addressable pattern 818 much easier, even if some points (e.g., dots) are missing.

The prerequisite is that the images from each viewpoint are physically separate—this is naturally true in multiple-sensor systems such as photogrammetry, but requires special care with systems like the defocusing concept (multiple apertures on a single lens imaging onto a single sensor).

The projected pattern 818 is produced by passing light 822 through a pattern stencil 824 and projector lens system 826 with a lens 804 substantially identical to the imaging lens 806.

For single-lens systems, the aperture images must be separate. This can be accomplished with prisms (See FIG. 8B and FIG. 8C) or fiberoptic bundles so that each aperture projects onto a separate sensor, or with a physically masked aperture (See FIG. 8D and FIG. 8E) if the sensor is a color sensor.

Figure 8C:
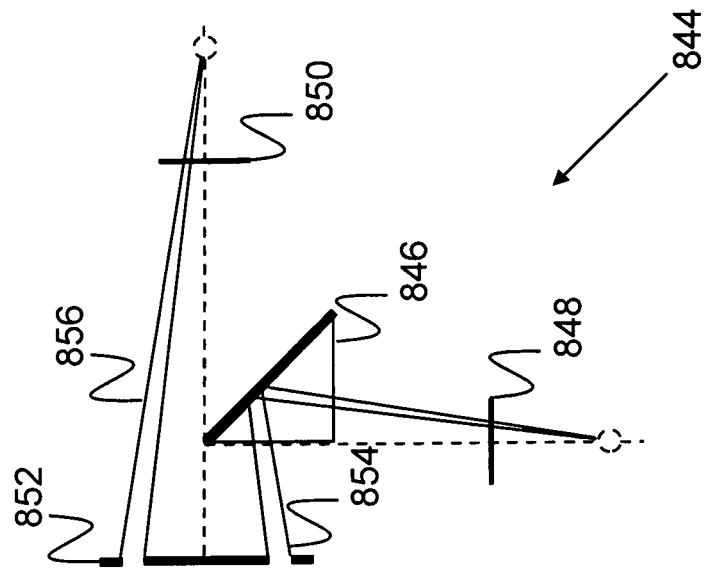
FIG. 8C is a one silvered offset prism and two-sensor system.
Figure 8B:
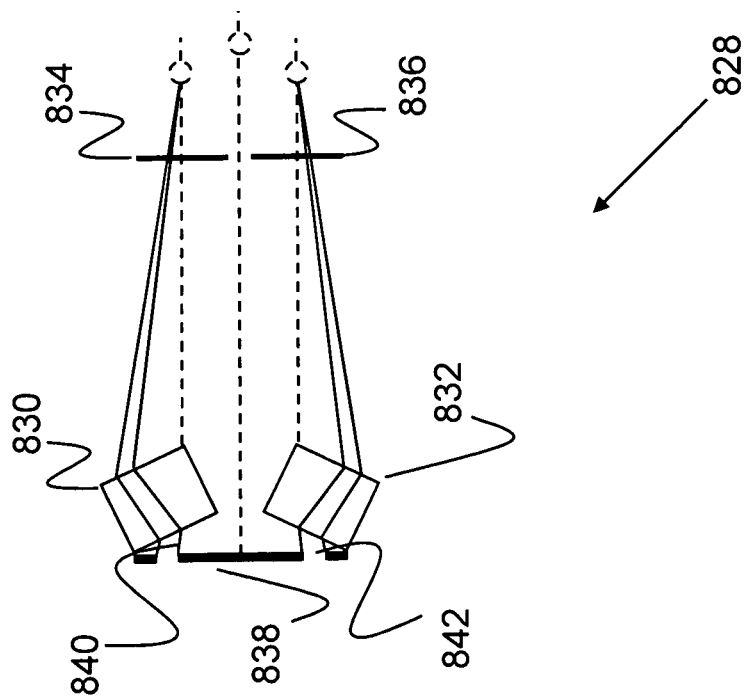
FIG. 8B is a two prism off-set and two-sensor system.

Referring to FIG. 8B, a two prism off-set and two-sensor system 828 is shown. The system 828 comprises a first prism 830, second prism 832, and a first sensor 834 and second sensor 836 behind a mask and two-slit aperture 838. The first prism 830 and second prism 832 offset the incoming light 840 and 842 from the two-slit aperture 838 such that light transmitted through the first prism 830 and second prism 832 may be detected by separate sensors 834 and 836. Such a configuration may be used when the two-slit aperture 838 is used to code information based on the inherent properties of light or the light must be separated as is the case when addressable pattern techniques are employed. Non-limiting examples of suitable inherent properties include but are not limited to the frequency, frequencies, or polarization of coded transmitted light detected images.

Referring to FIG. 8C, a one silvered offset prism and two-sensor system 844 is shown. The system 844 comprises a silvered prism 846, a first sensor 848 and second sensor 850 behind a mask and two-slit aperture 852. The silvered prism 846 offsets the first bundle of incoming light 854 from the two-slit aperture 852 such that light transmitted through the silvered prism 846 may be detected by the first sensor 848. Alternatively, light 856 which has passed through two-slit aperture 852 may also be detected separately on the second sensor 850.

Figure 8E:
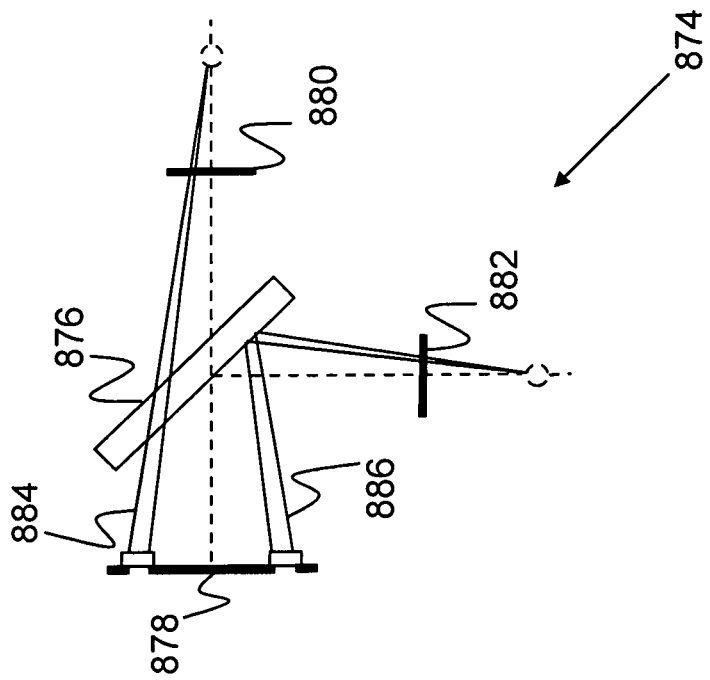
FIG. 8E is a narrow-band mirror sensor assembly system.
Figure 8D:
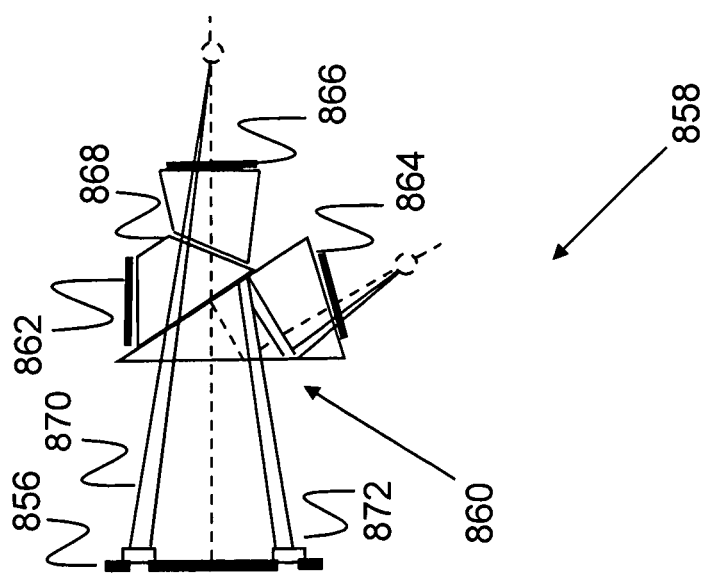
FIG. 8D is a three CCD-sensor assembly system.

Referring to FIG. 8D a three CCD-sensor assembly system 858 is shown. The system 858 comprises a three CCD-sensor 860 behind a mask and two-slit aperture 862. The CCD-sensor 860 includes a blue sensor 862, a green sensor 864, and a red sensor 866. The system of prisms 868 offsets the first bundle of incoming light 870 from the two-slit aperture 856 such that light transmitted through the prism 868 may be detected by the red sensor 866. Alternatively, light 872 which has passed through the two-slit aperture 852 may also be detected separately on the green sensor 864.

FIG. 8E is a narrow-band mirror sensor assembly system 874 is shown. The system 874 comprises a narrow-band mirror 876, located behind a mask and two-slit aperture 878, and a first sensor 880 and second sensor 882. The system narrow-band mirror 876 offsets the first bundle of incoming light 884 from the two-slit aperture 878 such that light transmitted through the narrow-band mirror 876 may be detected by the first sensor 880. Alternatively, light 886 which has passed through the two-slit aperture 878 may be detected separately on the second sensor 882.

(4.2) Pattern Projector (Laser)

Any lens can be represented by two "principal planes." The location of the planes is only a function of the lens, and all principal rays (which define the image centerline for a point) behave as if they entered the first principal plane and exited the second principal plane at the axis.

By measuring the location of the front principal plane and the field of view, a diffraction grating with the desired pattern can be made and positioned such that the beams from the laser projector coincide with the principal rays of the imaged dots. Thus, the projected pattern will look as though it does not move in the image even when the distance between the projected dot and the focal plane of the imaging lens changes. This makes searching for the addressable pattern much easier even if some dots are not imaged.

A complex ray trace through a compound lens (where the ray kinks at every air/glass interface) can be mathematically represented as two planes at which the rays kink. Thus, the left image shows the "real" ray trace, and the right image shows the mathematical representation of such lens. The planes are found by taking any chief (also called principal) ray coming into the first glass interface and leaving the last glass interface and extending them to intersect the axis of the lens. The intersection marks the location of the planes.

Thus, one would first do a calibration (by imaging a grid at several Z-distances) and then do a least-squares type fit to find out where those two planes are, and what the field of view angle is. Then, the diffraction grating can be customized to match the field of view angle, and put at the same distance from the beam-splitter as the first principal plane. Therefore, the laser beams will follow exactly the path of the principal rays.

In operation, an object, as it gets closer to a lens, gets bigger in the image. This means that the edges of the object move laterally on the image. The same would be true of any pattern projected in front of the camera onto a surface. By making the rays match exactly as in the aspect depicted in FIG. 9, none of the points ever move laterally, regardless of their Z-position.

Now, if a two-hole aperture mask is added, the corresponding dots still move apart from each other (the dots (images) are formed by the marginal, or outer, rays). However, since the chief ray is not moving laterally, the centroid of the corresponding "match shape" will not move laterally. Conceivably, once the distinguishable dot of the addressable pattern is located, the centroid of that match can be found. Knowing that the pattern is never expanding laterally, it is known where the centroid of every other point on the pattern should be, which should aid in "addressing" the points.

This is different than the traditional addressable pattern search, where the points are all moving relative to each other, so that if there's too much of a surface Z-change, the pattern may not be reconstructible.

Figure 9:
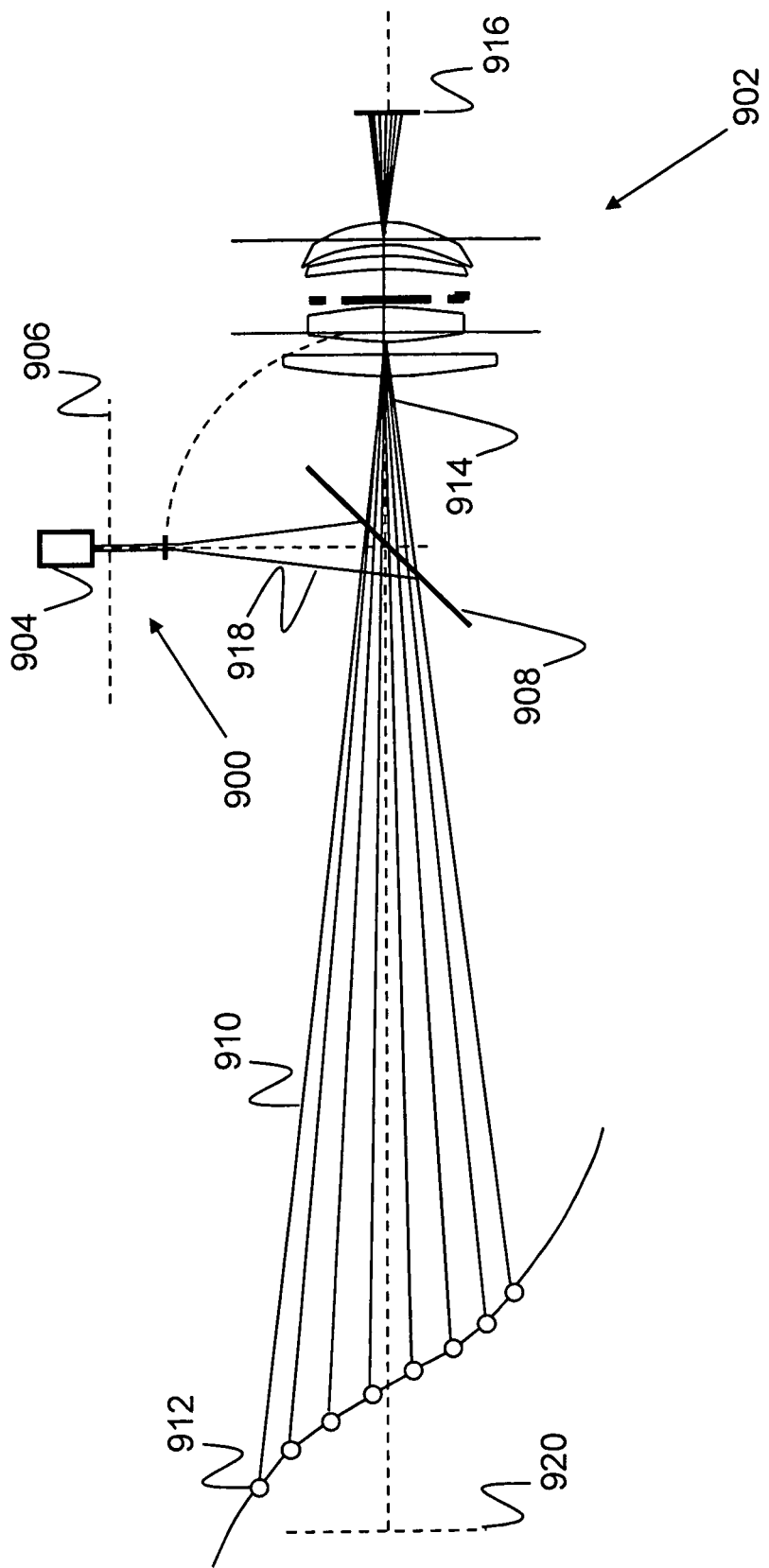
FIG. 9 is a laser pattern projector and imaging system.

Referring to FIG. 9, a laser pattern projector system 900 and imaging system 902 are shown. The laser pattern projector system 900 comprises a laser projector 904 and a filtering mask 906. The filtering mask 906 selectively passes light from the projector 904 onto the fifty percent beam splitter 908. The laser projector 904 and a filtering mask 906 are in-line with the beamsplitter 908 which causes the principal rays 910 of the projected points 912 to coincide with the principal rays 914 detected by the sensor 916 of the imaging system 902. Thus the projected pattern 918 will look as though it does not move in the detected image, even when the distance between the projected point 912 and the focal plane 920 of the imaging lens 906 changes. This makes identifying an addressable pattern 918 much easier, even if some points (e.g., dots) are missing.

(5.0) Imaging Methods

Figure 10:
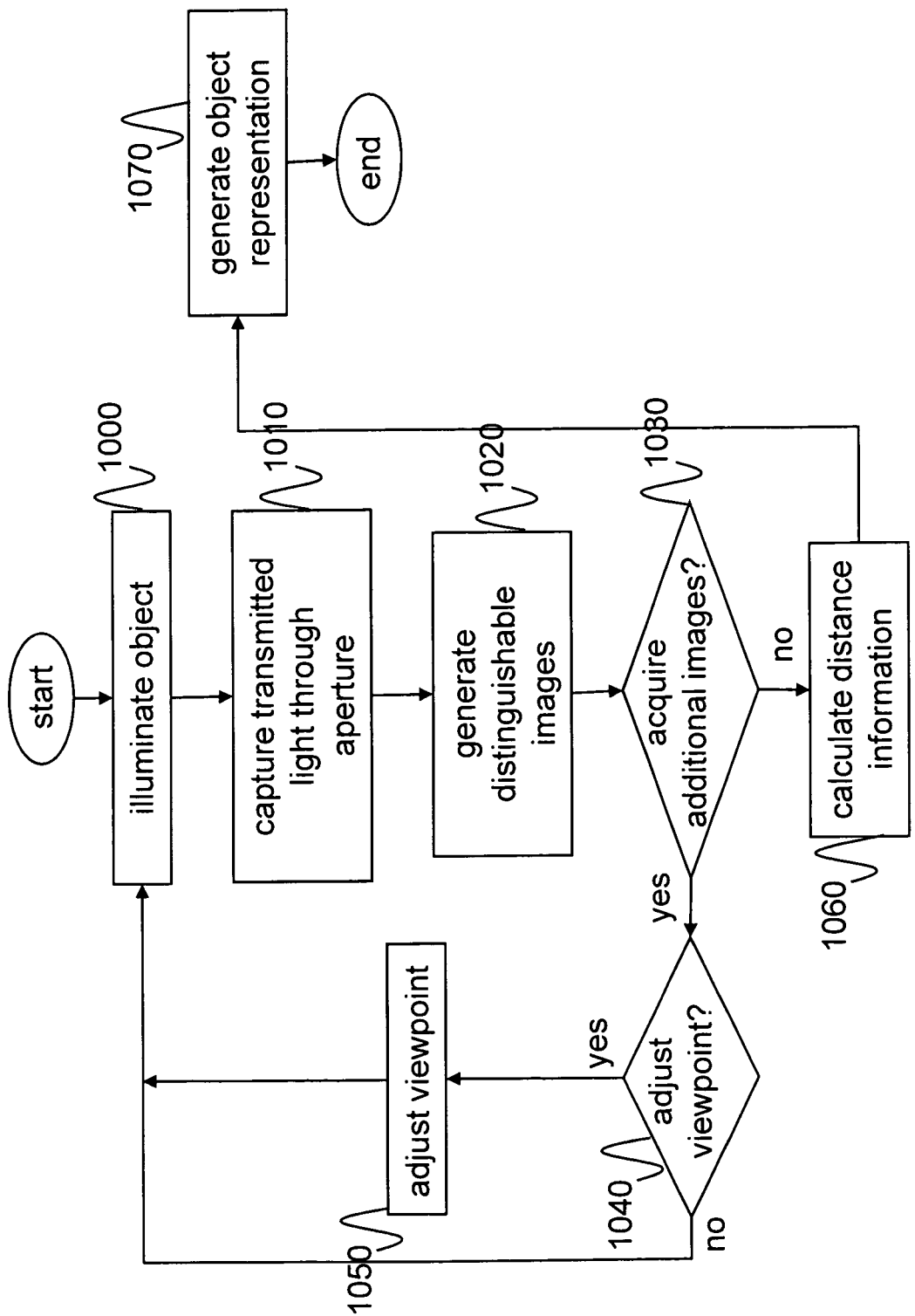
FIG. 10 is a flow chart depicting the steps of acquiring and processing images in order to develop a representation of the surface of an object.

Referring to FIG. 10, a flow chart depicting the steps of acquiring and processing images to develop a two dimensional or three dimensional representation of the surface of an object is shown. Any single-lens device may be built or modified to include an imaging lens, an aperture configured to generate distinguishable images, a sensor, and a processor.

The imaging process begins by illuminating the surface of the object 1000. The surface may illuminated by the imaging system or a suitable external lighting source. Light is reflected off of the surface of the object and transmitted through the aperture 1010. The aperture may be placed in the plane of the imaging lens, in front of the imaging lens, behind the imaging lens, may be applied at an aperture plane of the imaging lens when accessible, or made accessible via a relay lens system.

As the light travels past the aperture, the aperture may be used in a number of ways to code information received by the sensor. Non-limiting examples of suitable methods by which light may be coded in order to produce distinguishable images 1020 on the sensor include but are not limited to: filtering transmitted light according to light characteristics (such as filtering by wavelength or polarization), transmitting light as a function of time such that the distinguishable images are allowed to pass through the aperture as a function of time; or physically altering the shape of the aperture to comprise a series of different shapes from which transmitted light through the aperture produces distinguishable shape-based images.

A step may be also be implemented which aides the system in determining whether or not to acquire additional images 1030. The step may further be augmented to weigh the suitability of an acquired image. For example, an image detected by a sensor which suffered from excess movement during the exposure may be discarded by the algorithm. In this case, the last acquired image would be discarded and the process would be repeated with the illumination of the object 1000. In another aspect, the received image may be suitable for processing; however, more image acquisition images are needed 1030. In this case, a further decision can be added to further augment the algorithm. An example of which would be to add a decision to determine whether or not the viewpoint of the imaging system should be adjusted 1040. If the position of the imaging device or the desired area of the object needs to be shifted, either the imaging system or the target object may be altered to adjust the viewpoint 1050.

Once all or at least some of the images have been acquired, the relationship amongst points, or point information, within each image is used to calculate or determine the relative or absolute distance information for each point 1060. Once the distance information is known, the information may be fed to an algorithm which uses the distance information to generate a representation (e.g., 3-D mapping) of the object 1070.

(6.0) Image Matching

For large objects or applications which require multiple exposure acquisitions, image matching provides a method by which related image acquisitions may be tied together to recreate an object surface. Although not required to recreate the target object, when the position of the imaging system is known relative to the target object, image matching offers the ability to recreate a target object with exact measurements. In general, image matching, also referred to as digital quilting, is greatly aided by the use of an addressable-pattern template image. In one aspect, the addressable pattern projector may be physically tied to the acquisition device. In another aspect, the addressable pattern projector may move independently of the device, but in such a way that the pattern visible by the device is still addressable.

An imaging device acquires an addressable-pattern template image at an initial position. The addressable-pattern template image typically has a finite number of points in the X, Y, and Z-planes. The position of the imaging device is then adjusted and a second addressable-pattern template image is acquired at second position. Precautions may be taken such that an adjusted position determined to exceed motion constraints are ignored. The second position, or adjusted position, is related to the initial imaging device position by a six-variable solid translation and rotation. Typically, the adjusted position is related to the initial position by the fact that the image captured at the new position overlaps in part with the first template image and has a substantially similar number of points.

In operation, at least one outer hull is generated by a processor or is manually highlighted by the user. The outer hull encompasses all the points within the addressable-pattern template image and addressable-pattern surface image. Although not always the case, the points outside the addressable-pattern template image outer hull may be disregarded. A plurality of inner hulls of the points in the addressable-pattern surface image is also generated. The inner hull is a function of a maximum acceptable displacement between acquisitions within the intersection of the plurality of hulls, according to the six-variable solid-body translation and rotation. The error may be calculated from the difference between a point on the addressable-pattern surface image and the addressable-pattern template image.

When the hulls have been generated, the addressable-pattern information is processed using a matching algorithm. The matching algorithm is configured to determine the distance between each point on the addressable-pattern surface image and its corresponding point on the addressable-pattern template image. Each of the matched points is then merged from the plurality of inner hulls according to their solid-body translations and rotations to form a high-resolution data set.

When hundreds or possibly thousands of acquisitions have been matched, the point clouds are merged according to their solid-body translations and rotations. An algorithm that uses the addressable pattern information may also be adapted to determine whether or not enough matching points exist to recover the features of the target object. When a high-resolution point cloud has been developed, the high-resolution point cloud can be used to generate or output a high-resolution surface (nurbs, meshes, etc.) with or without interpolation via standard algorithms or commercial packages, such as Geomagic Studio. Geomagic Studio is produced by Geomagic, located at 3200 East Hwy 54, Cape Fear Building, Suite 300, Research Triangle Park, N.C., 27709 U.S.A.

The fit is considered satisfactory if the total error is below some threshold which is a function of the precision of the device. Once this is done, second acquisition at the adjusted position becomes the template and the next acquisition becomes the surface matched to it. The robustness of addressable pattern information in the matching algorithm allows for the matching of small set to small set, without interpolating the surface shape until enough acquisitions are available.

Figure 11:
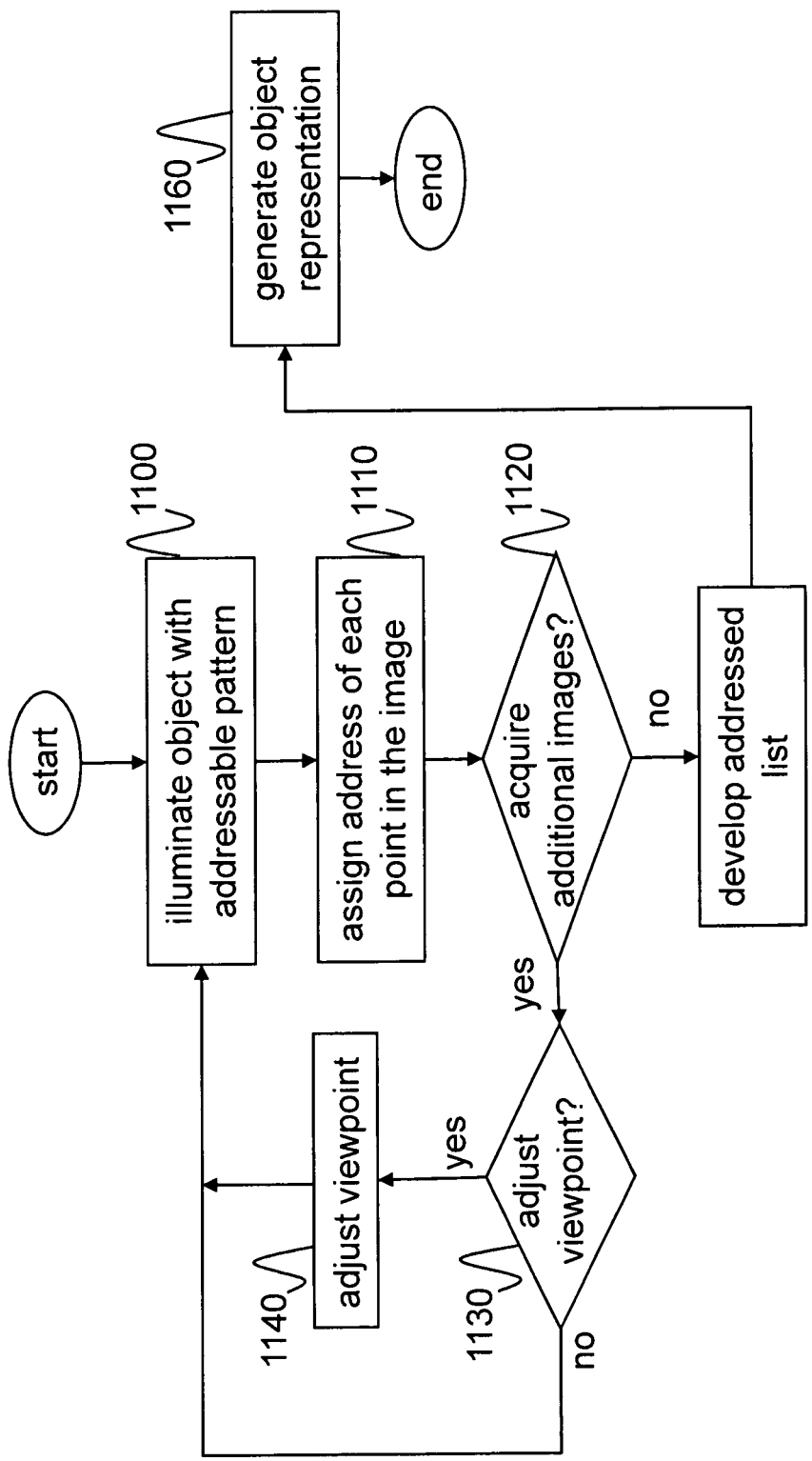
FIG. 11 is a flow chart depicting the incorporation of an addressable pattern to an imaging system in order to aide in image reconstruction.

Referring to FIG. 11, a flow chart depicting the use of an addressable pattern to aide in image reconstruction is shown. The use of an addressable pattern during surface feature acquisition is one way of bypassing the correspondence search employed in a separable-viewpoint three-dimensional imaging system.

The process begins with the acquisition of a number of images, each of the images containing (being illuminated with) an addressable pattern 1100. Each image is typically taken from a different viewpoint, although the addressable pattern is static with respect to the contours of the object's surface. Each of the plurality of images comprising at least a portion of the addressable pattern information and at least one point representing at least one aspect of the target object. It will be appreciated that an object may include a variety of points on the object. Each point may provide important information with respect to the eventual reconstruction of the object.

An address is assigned to each point in the image 1110. In general the addressable pattern provides a sequence or series of plots on the object which may be referenced to assist in the addressing step 1110. Importantly, the addressable pattern need not be symmetrical or contain a regular sequence of markers or images. Non-limiting examples of suitable addressable pattern information may include a color sequence pattern, a pattern comprising differently shaped object, a position sequence pattern, distinguishable object features or object landmarks, or any combination thereof. The addressable pattern image may be placed on the surface of the object in a variety of ways. Non-limiting examples of suitable methods include: projecting the addressable pattern image onto the surface of the object; physically placing an addressable pattern image onto the surface of the object; and using the features inherent to the object being imaged as a source.

A step may be also be implemented which aides the system in determining whether or not to acquire additional images 1120. The step may further be augmented to weigh the suitability of an acquired image. For example, an image detected by a sensor which suffered from excess movement during the exposure may be discarded by the algorithm. In this case, the last acquired image would be discarded and the process would be repeated with the illumination of the object 1100. In another aspect, the received image with an addressable pattern may be suitable for processing; however, more image acquisition images are needed to reconstruct the object. In this instance, a further decision process can be added to further augment the algorithm. An example of which would be to add a decision to determine whether or not the viewpoint of the imaging system should be adjusted 1130. If the position of the imaging device or the desired area of the object needs to be shifted, either the imaging system or the target object may be altered to adjust the viewpoint 1140.

Once all or at least some of the images have been acquired, the relationship amongst points, or point information, within each image is used to calculate or determine the relative or absolute distance information for each point. Once the distance information is known, the information may be fed to an algorithm which uses the distance information to generate a representation of the object 1160.

The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

As used in this disclosure, except where the context requires otherwise, the term "comprise" and variations of the term, such as "comprising," "comprises" and "comprised" are not intended to exclude other additives, components, integers or steps.

Also, it is noted that the embodiments are disclosed as a process that is depicted as a flowchart, a flow diagram, a structure diagram, or a block diagram. Although a flowchart may disclose various steps of the operations as a sequential process, many of the operations can be performed in parallel or concurrently. The steps shown are not intended to be limiting nor are they intended to indicate that each step depicted is essential to the method, but instead are exemplary steps only.

In the foregoing specification, the invention has been described with reference to specific embodiments thereof. It will, however, be evident that various modifications and changes may be made thereto without departing from the broader spirit and scope of the invention. The specification and drawing are, accordingly, to be regarded in an illustrative rather than a restrictive sense. It should be appreciated that the present invention should not be construed as limited by such embodiments.

From the foregoing description, it will be apparent that the present invention has a number of advantages, some of which have been described herein, and others of which are inherent in the embodiments of the invention described or claimed herein. Also, it will be understood that modifications can be made to the device, apparatus and method described herein without departing from the teachings of subject matter described herein. As such, the invention is not to be limited to the described embodiments except as required by the appended claims.

What is claimed is:

1. A method for constructing a representation of a surface of a target object by using an addressable pattern, comprising acts of:
   acquiring a plurality of images of an addressable pattern from different viewpoints through an imaging lens and a mask having at least one set of off-axis apertures, each of the plurality of images comprising addressable pattern information and at least one point representing at least one aspect of a target object, wherein the at least one set of off-axis apertures filters light reflected from the surface of the target object into the plurality of images;
   processing the plurality of images to assign an address to each point in each of the plurality of images;
   developing an addressed list of points using the address of each point in each of the plurality of images;
   returning the addressed list of points to an imaging system processor for conversion into a three-dimensional measurement; and
   causing the imaging system processor to generate a representation of a surface of a target object based on the three-dimensional measurement.

2. The method of claim 1, further comprising an act of projecting the addressable pattern image onto the surface of the target object to generate a plurality of images of an addressable pattern.

3. The method of claim 2, wherein in the act of projecting the addressable pattern image onto the surface of the target object, the projected addressable pattern image is a pattern selected from a group consisting of a color sequence pattern and a shape sequence pattern.

4. The method of claim 2, wherein in the act of projecting the addressable pattern image onto the surface of the target object, the projected addressable pattern image is a position sequence pattern.

5. The method of claim 1, further comprising an act of physically placing an addressable pattern image onto the surface of the target object.

6. The method of claim 5, wherein in the act of projecting the addressable pattern image onto the surface of the target object, the projected addressable pattern image is a pattern selected from a group consisting of a color sequence pattern and a shape sequence pattern.

7. The method of claim 5, wherein in the act of projecting the addressable pattern image onto the surface of the target object, the projected addressable pattern image is a position sequence pattern.

8. The method of claim 1, further comprising an act of providing a target object such that the addressable pattern is inherent in the target object being imaged.

9. The method of claim 1, further comprising calculating distance information between corresponding points in each of the plurality of images.

10. The method of claim 9, wherein the distance information is in relation to a focal length.

* * * * *